US008811763B2

(12) United States Patent
Meyers et al.

(10) Patent No.: US 8,811,763 B2
(45) Date of Patent: Aug. 19, 2014

(54) METHOD AND SYSTEM FOR PRODUCING IMAGE FRAMES USING QUANTUM PROPERTIES

(75) Inventors: Ronald Everett Meyers, Columbia, MD (US); Keith Scott Deacon, Coumbia, MD (US); Arnold Tunick, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 63 days.

(21) Appl. No.: 13/585,056

(22) Filed: Aug. 14, 2012

(65) Prior Publication Data

US 2012/0327287 A1 Dec. 27, 2012

Related U.S. Application Data

(63) Continuation-in-part of application No. 13/477,890, filed on May 22, 2012, which is a continuation-in-part of application No. 13/247,470, filed on Sep. 28, 2011, now Pat. No. 8,532,427, which is a continuation-in-part of application No. 13/198,133, filed on Aug. 4, 2011, now Pat. No. 8,373,107, which is a continuation-in-part of application No. 12/819,602, filed on Jun. 21, 2010, now Pat. No. 8,242,428, which is a continuation-in-part of application No. 12/330,401, filed on Dec. 8, 2008, now Pat. No. 7,812,303, and a continuation-in-part of application No. 12/343,384, filed on Dec. 23, 2008, now Pat. No. 7,847,234.

(60) Provisional application No. 60/993,792, filed on Dec. 6, 2007.

(51) Int. Cl.
*G06K 9/40* (2006.01)

(52) U.S. Cl.
USPC .................................... 382/254; 348/E5.029

(58) Field of Classification Search
None
See application file for complete search history.

(56) References Cited

U.S. PATENT DOCUMENTS

| 5,422,673 | A | * | 6/1995 | Kondo et al. ................. 348/352 |
| 5,515,438 | A | | 5/1996 | Bennett |
| 5,675,648 | A | | 10/1997 | Townsend |
| 5,953,421 | A | | 9/1999 | Townsend |

(Continued)

OTHER PUBLICATIONS

Koashi et al., Probabilistic Manipulation of Entangled Photons, 2001, The American Physical Society, pp. 1-4.

(Continued)

*Primary Examiner* — Michelle Entezari
(74) *Attorney, Agent, or Firm* — Lawrence E. Anderson

(57) ABSTRACT

A system and method for generating a series of frames of a subject comprising measuring light reflected from the subject into at least one first receiver at first points in time; receiving spatial information relating to the light source illumination independent of interaction with the subject at second points in time into at least one second receiver, at least some of second points occurring before or after the first points in time; transmitting a measured value from the at least one first receiver to a processor; transmitting the spatial information relating to the light source illumination from a second receiver to a processor; correlating the measured values from the at least one first receiver at the first points in time with the spatial information derived from the at least one second receiver at the corresponding second points in time; and creating frames of a subject.

20 Claims, 29 Drawing Sheets

(56) References Cited

U.S. PATENT DOCUMENTS

| | | | |
|---|---|---|---|
| 5,999,285 A | 12/1999 | Brandt et al. | |
| 6,272,224 B1 | 8/2001 | Mazourenko | |
| 6,289,104 B1 | 9/2001 | Patterson | |
| 6,424,665 B1 | 7/2002 | Kwiat et al. | |
| 6,444,999 B1 | 9/2002 | Tomita | |
| 6,479,301 B1* | 11/2002 | Balch et al. | 506/16 |
| 6,748,083 B2 | 6/2004 | Hughes et al. | |
| 6,864,501 B2 | 3/2005 | Shields et al. | |
| 6,895,091 B1 | 5/2005 | Elliott et al. | |
| 7,088,457 B1* | 8/2006 | Zou et al. | 356/512 |
| 7,197,523 B2 | 3/2007 | Lutkenhaus et al. | |
| 7,242,774 B1 | 7/2007 | Elliott et al. | |
| 7,317,574 B2 | 1/2008 | Zoller et al. | |
| 7,988,297 B2* | 8/2011 | Crill | 353/20 |
| 8,466,917 B2* | 6/2013 | Benitez et al. | 345/426 |
| 8,587,686 B1* | 11/2013 | Riza et al. | 348/222.1 |
| 2001/0055389 A1 | 12/2001 | Hughes et al. | |
| 2002/0016533 A1* | 2/2002 | Marchitto et al. | 600/310 |
| 2002/0097874 A1 | 7/2002 | Foden et al. | |
| 2002/0139920 A1* | 10/2002 | Seibel et al. | 250/208.1 |
| 2003/0112970 A1 | 6/2003 | Mitra | |
| 2005/0046848 A1* | 3/2005 | Cromwell et al. | 356/417 |
| 2006/0244831 A1* | 11/2006 | Kraft et al. | 348/157 |
| 2007/0165208 A1* | 7/2007 | Cowburn et al. | 356/71 |
| 2008/0282362 A1* | 11/2008 | Brulet et al. | 800/3 |
| 2009/0093807 A1* | 4/2009 | Hyde et al. | 606/34 |

OTHER PUBLICATIONS

Jennewein, Quantum Communication and Teleportation Experiments Using Entangled Photon Pairs, Jun. 11, 2002, Dissertation, pp. 1-141.

Naik et al., Entangled State Quantum Cryptography: Eavesdropping on the Ekert Protocol, May 15, 2000, The American Physical Society, pp. 4733-4736.

G. Ribordy, et al., "Long-Distance Entanglement-based Quantum Key Distribution," Physical Review A. vol. 63, 012309-12. Dec. 13, 2000.

Walton et al.,"Performance of Photon-Pair Quantum Key Distribution Systems," et al., J. Mod. Optics, 48, pp. 2055-2063 (2001).

Nasr et al., "Biphoton Focusing for Two-Photon Excitation," Phys. Rev. A, 65, 023816-[1-5] (2002).

"Quantum Cryptography," by N. Gisin, et al, Reviews of Mod. Phys. 74, 145-195 (2002).

"Quantum Cryptography Using Optical Fibers," by J.D. Franson, et al., Appl. Otp., 33, 2049-2954 (1994).

"Operational System for Quantum Cryptography," by J.D. Franson, et al., Elect. Lett. 31, 232-234 (1995).

"Quantum Cryptography in Free Space," by B.C. Jacobs, et al., Opt. Lett., 21, 1854-1856 (1996).

"Practical Quantum Key Distribution Over a 48 km Optical Fiber Network," by R.G. Hughes, et al., J. Mod. Opt. 47, 533-47 (2000).

"Free Space Quantum Distribution in Daylight," by R.G. Hughes, et al., J. Mod. Opt. 47, 549-562 (2000).

"Entangled State Quantum Cryptography: Eavesdropping on the Ekert Protocol," by D.S. Naik, et a., Phys. Rev. Lett., 84, 4733 (2000).

"One-Way Entangled-Photon Autocompensating Quantum Cryptography," by Z.D. Walton, Physical Review A., v. 67, 052309 (2003).

Secure Communication Using Mesoscopic Coherent States, by G.A. Barbosa, et al., Phys. Rev. Lett., 90, 227901 (2003).

"Tayloring Single and Multiphoton Probabilities of a Single Photon On-Demand Source," by A.L. Migdall, Phys. Rev. A., 66, 053805 (2002).

C. Elliott, "Buiilding the Quantum Network," New Journal of Physics 4, 46, Jul. 12, 2002.

"Degenerate Noncollinear Emission From a Type I Collinear Parametric Oscillator," by M.J. Shelton, et al., Optics Express, 9, pp. 16-22 (2001).

"Quantum cryptography using any two nonorthogonal states," by C.H. Bennett, Phys. Rev. Lett., 67, 3121 (1992).

"Purification of Noisy Entanglement and Faithful Teleportation via Noisy Channels," by C.H. Bennett, Phys. Rev. Lett., 76, No. 5, Jan. 29, 1996, pp. 722-725.

"Two-Photon Geometric Optical Imaging and Quantum 'CYPTO-Fax,'" by Y.H. Shih, et al., SPIE Proceedings, vol. 2799, pp. 164-171 (1996).

"Spatial Correlations of Spontaneously Down-Converted Photon Pairs Detected With a Single-Photon Sensitive CCD Camera," by B.M. Jost, Optics Express, 3, pp. 81-87 (1998).

T. Jennewein, "Quantum Cryptography with Entangled Photons," Physical Review Letters, vol. 84, No. 20, pp. 4729-4732.

Violations of Bell Inequalities by Photons More Than 10 km Apart, by W. Tittel, et al., Phys Rev. Lett., 81, pp. 3563-3566 (1998).

U.S. Appl. No. 60/456,871 to Elliott, et al., filed Mar. 21, 2003, entitled "Quantum Key Distribution Apparatus Based on Entangled Photons."

Artur K. Ekert, Quantum Cryptography Based on Bell's Theorem, Physical Review Letters, vol. 67, No. 6, Aug. 5, 1991.

J.D. Fransen, "Bell Inequality for Position and Time," Physical Review Letters, vol. 62, No. 19, May 8, 1989.

N. Gisin, et al., "Quantum Cryptography and Long Distance Bell Experiments: How to Control Decoherence," University of Geneva, Geneva Switzerland, Jan. 15, 1999.

G. Jaeger & A. Sergienko, "Multi-photon Quantum Inferometry," Progress in Optics 42, Chapter 5, pp. 277-324 (2001).

D.S. Naik, "Entangled State Quantum Cruptography: Eavesdropping on the Ekert Protocol," Physical Review Letters, vol. 84, No. 20, pp. 4733-4736.

Shapiro, J.H. "Computational Ghost Imaging,"Massachusetts Institute of Technology, Research Laboratory of Electronics, Cambridge, Massachusetts 02139, USA, arXiv:0807.2614v1 [quant-ph] Jul. 16, 2008.

* cited by examiner

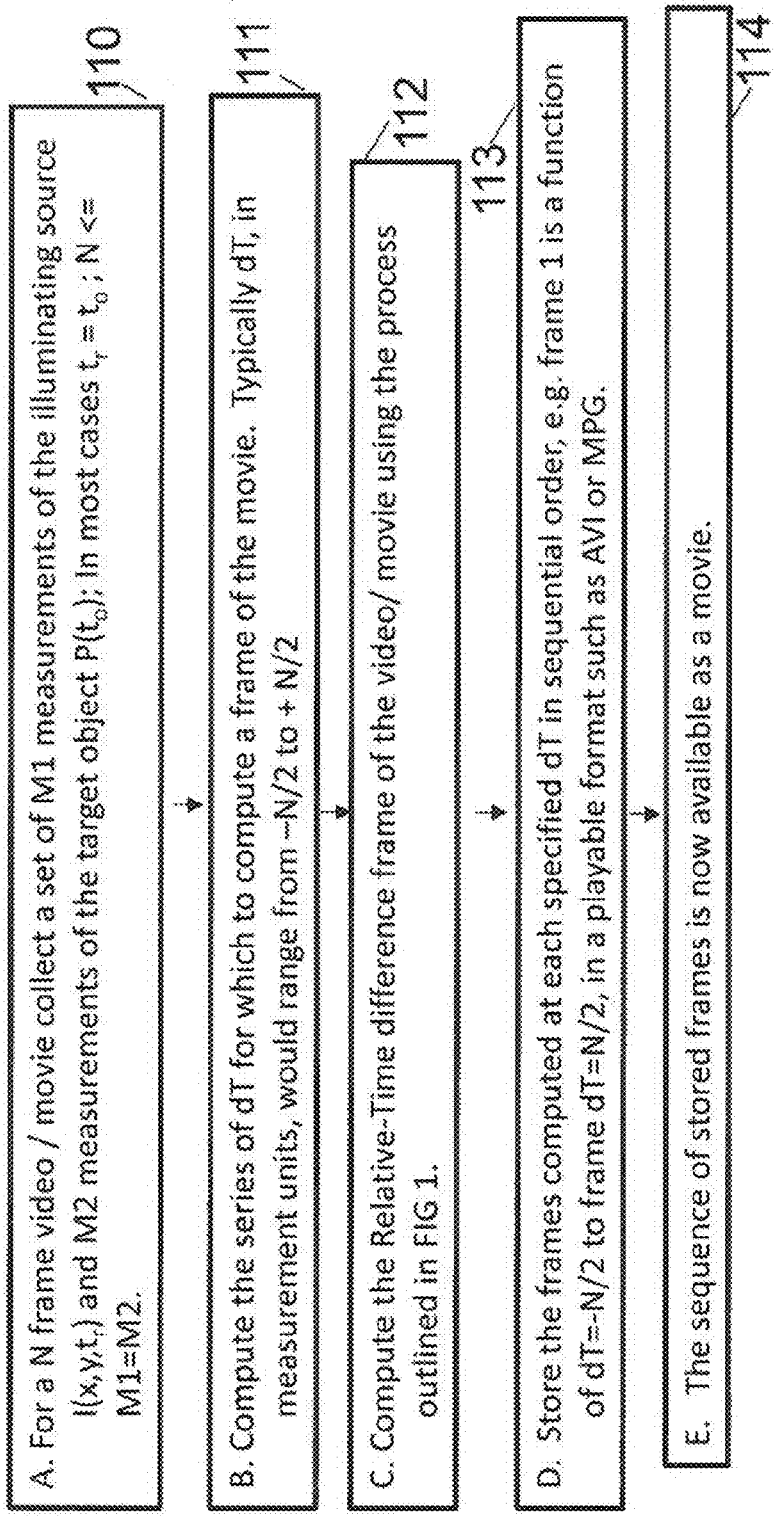

FIG. 2 FLOW CHART- Exemplary Relative-Time difference Movie Process

A. For a N frame video / movie collect a set of M1 measurements of the illuminating source $I(x,y,t_r)$ and M2 measurements of the target object $P(t_o)$; In most cases $t_r = t_o$; N <= M1=M2.

B. Compute the series of dT for which to compute a frame of the movie. Typically dT, in measurement units, would range from -N/2 to + N/2

C. Compute the Relative-Time difference frame of the video/ movie using the process outlined in FIG 1.

D. Store the frames computed at each specified dT in sequential order, e.g. frame 1 is a function of dT=-N/2 to frame dT=N/2, in a playable format such as AVI or MPG.

E. The sequence of stored frames is now available as a movie.

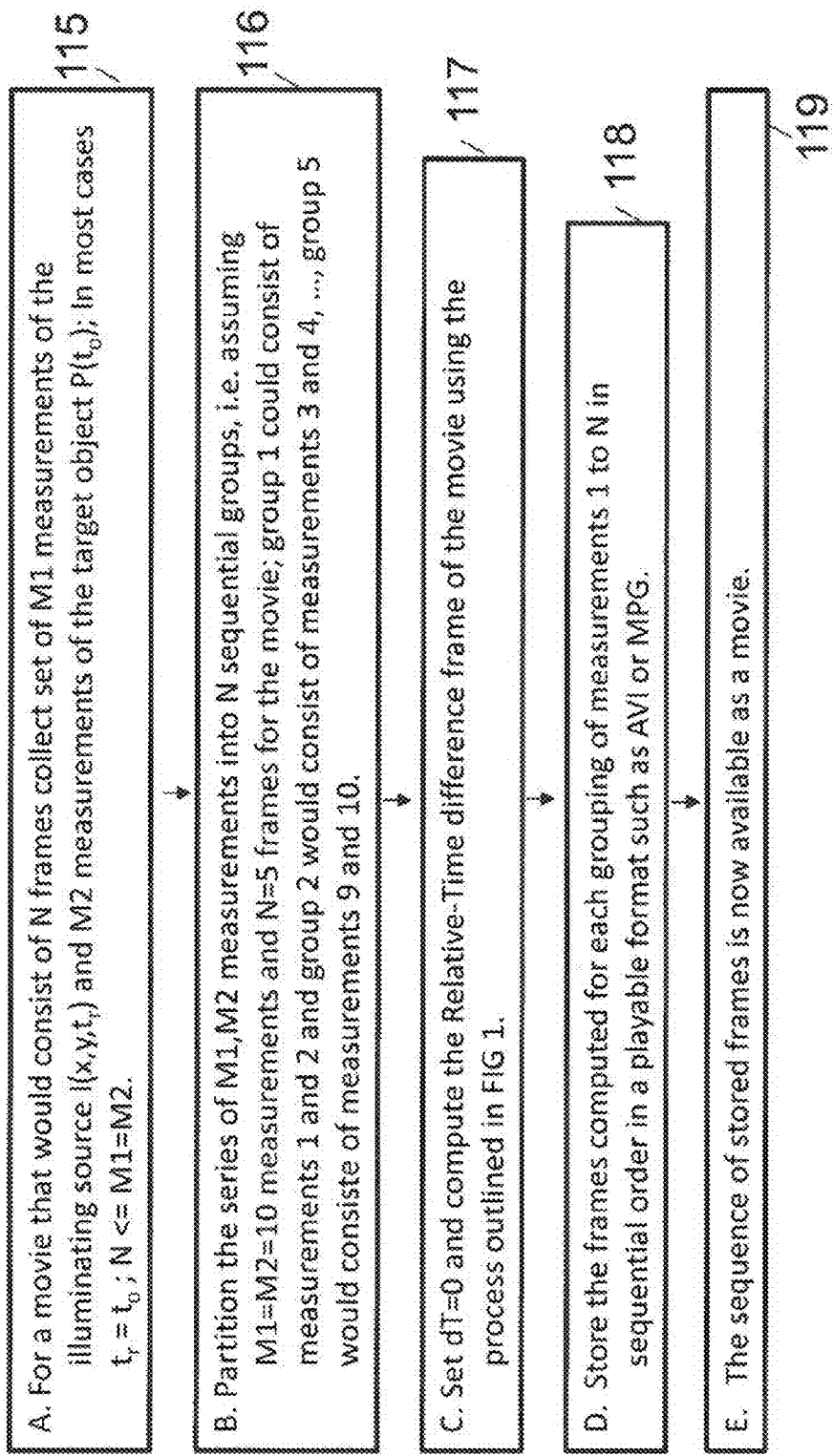

FIG. 3 FLOW CHART- Exemplary Relative-Time Difference = 0 Movie Process

A. For a movie that would consist of N frames collect set of M1 measurements of the illuminating source $I(x_i, y_i, t_i)$ and M2 measurements of the target object $P(t_o)$. In most cases $t_r = t_o$; $N <= M1=M2$.

B. Partition the series of M1,M2 measurements into N sequential groups, i.e. assuming M1=M2=10 measurements and N=5 frames for the movie: group 1 could consist of measurements 1 and 2 and group 2 would consist of measurements 3 and 4, ..., group 5 would consiste of measurements 9 and 10.

C. Set dT=0 and compute the Relative-Time difference frame of the movie using the process outlined in FIG 1.

D. Store the frames computed for each grouping of measurements 1 to N in sequential order in a playable format such as AVI or MPG.

E. The sequence of stored frames is now available as a movie.

FIG. 13  SUM OF ALL BESSEL ILLUMINATION PATTERNS USED CROPPED TO AREA OF INTEREST

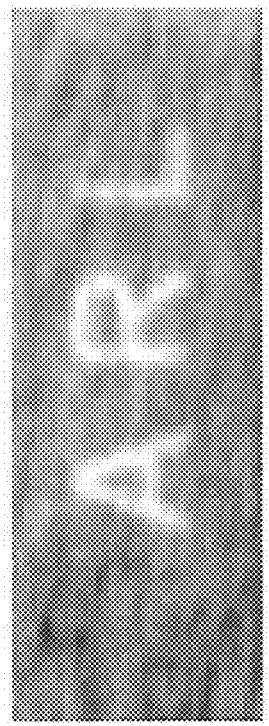
FIG. 16A Ghost Image Computed using 0 frame time shift under non turbulent conditions.
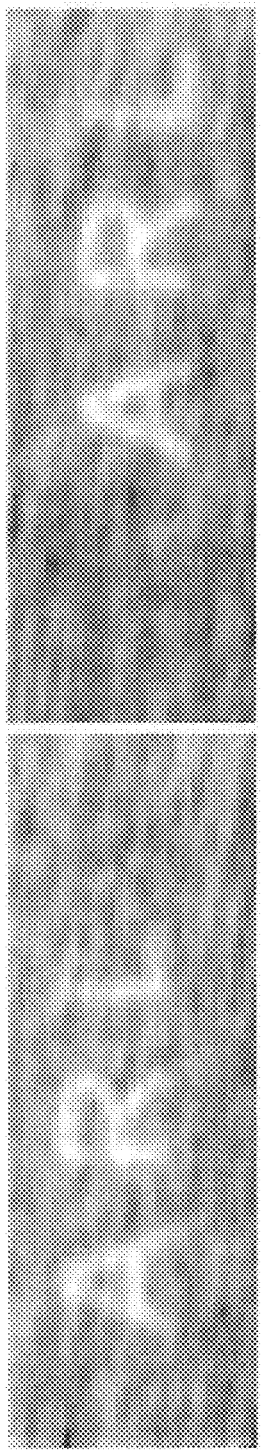
FIG. 16B Ghost Image Computed using -10 frame time shift under non turbulent conditions.
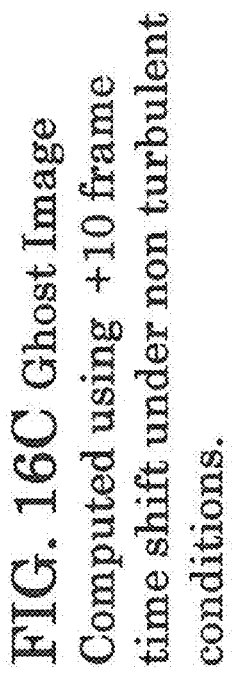
FIG. 16C Ghost Image Computed using +10 frame time shift under non turbulent conditions.

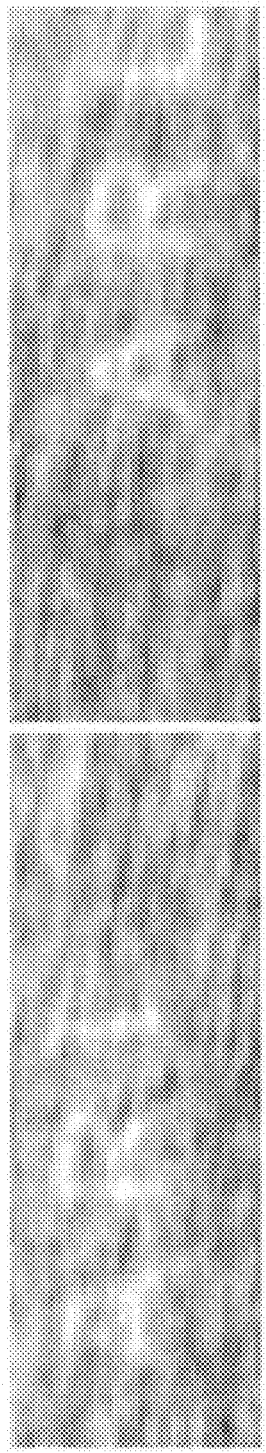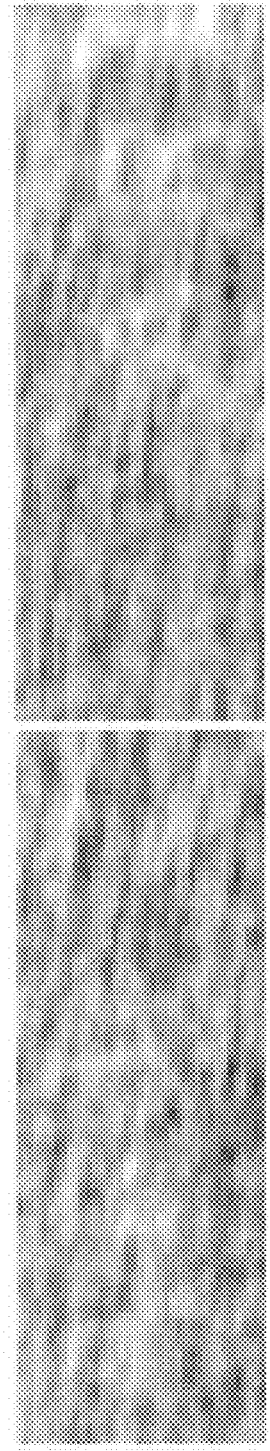
FIG. 17A Ghost Image Computed using -15 frame time shift shift under non turbulent conditions.
FIG. 17B Ghost Image Computed using +15 frame time shift under non turbulent conditions.
FIG. 18A Ghost Image Computed using -20 frame time shift under non turbulent conditions.
FIG. 18B Ghost Image Computed using +20 frame time shift under non turbulent conditions.

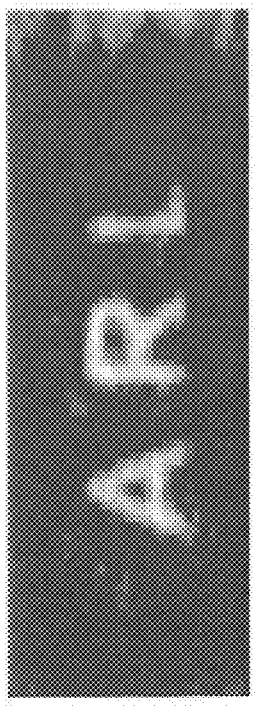
FIG. 19A Ghost Image Computed using 0 frame time shift under turbulent conditions.
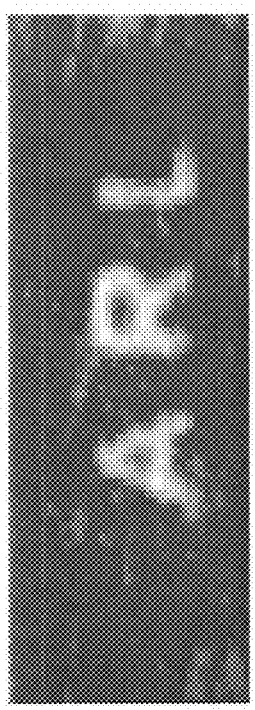
FIG. 19C Ghost Image Computed using +5 frame time shift under turbulent conditions.
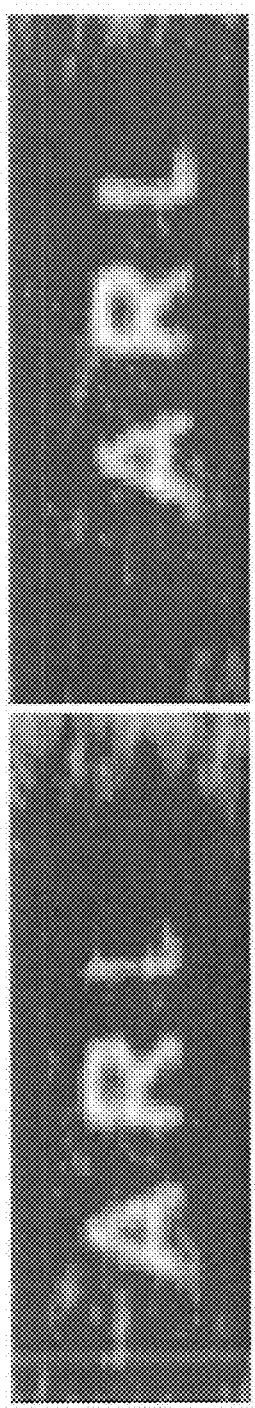
FIG. 19B Ghost Image Computed using −5 frame time shift under turbulent conditions.

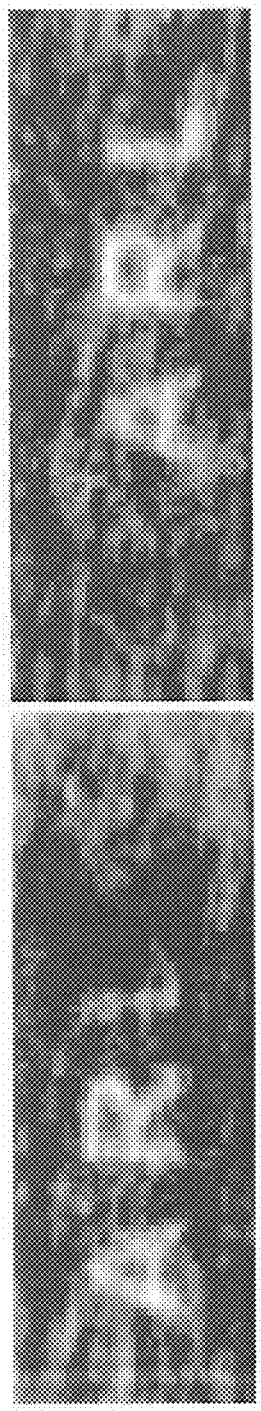 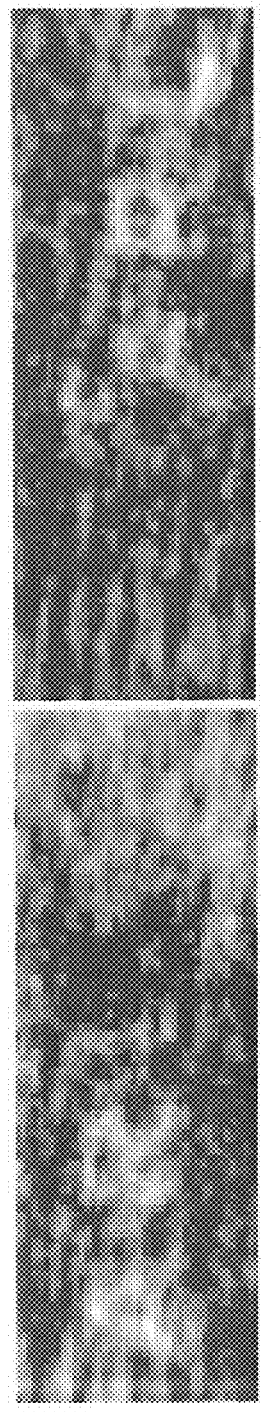 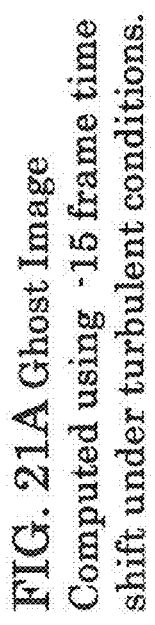
FIG. 20A Ghost Image Computed using -10 frame time shift under turbulent conditions.
FIG. 20B Ghost Image Computed using +10 frame time shift under turbulent conditions.
FIG. 21A Ghost Image Computed using -15 frame time shift under turbulent conditions.
FIG. 21B Ghost Image Computed using +15 frame time shift under turbulent conditions.

Reference
Measurement Times  $t_r^1$  $t_r^2$  $t_r^3$  $t_r^4$  ...  $t_r^N$

Target
Measurement Times  $t_o^1$  $t_o^2$  $t_o^3$  $t_o^4$  ...  $t_o^N$

Time / Frame

Illustration of the time / frame measurements between the Reference and Target measurements with a 0 time offset or frame offset

FIG 26

METHOD AND SYSTEM FOR PRODUCING IMAGE FRAMES USING QUANTUM PROPERTIES

CROSS-REFERENCE TO RELATED APPLICATIONS

This application is a continuation-in-part application of U.S. application Ser. No. 13/477,890, entitled "Image Enhancement System and Method" filed May 22, 2012, which is a continuation-in-part of application Ser. No. 13/247,470 entitled "System and Method for Image Enhancement" by R. Meyers & K. Deacon, filed Sep. 28, 2011, and application Ser. No. 13/198,133 entitled "Method and System for Non-line-of-sight Imaging" filed Aug. 4, 2011, which in turn claims priority of U.S. patent application Ser. No. 12/819,602 entitled "Method and System for LIDAR Utilizing Quantum Properties," filed Jun. 21, 2010 which will issue Aug. 14, 2012, as U.S. Pat. No. 8,242,428 which in turn claims priority of U.S. application Ser. No. 12/330,401 (U.S. Pat. No. 7,812,303) entitled "Method and System for Creating an Image Using Quantum Properties of Light Based Upon Spatial Information From a Second Light Beam Which Does not Illuminate the Subject," filed Dec. 8, 2008, which claims priority to U.S. Provisional Patent Application Ser. No. 60/993,792 filed Dec. 6, 2007. Priority is claimed through the U.S. Pat. No. 8,242,428 which claims priority of U.S. patent application Ser. No. 12/343,384, filed Dec. 23, 2008, entitled "Method and System for Quantum Imaging Using Entangled Photons Pairs," which issued as U.S. Pat. No. 7,847,234, which also claims priority of U.S. Pat. No. 7,812,303, which claims priority to U.S. Provisional Application No. 60/993, 792. Priority is claimed through all of the above listed applications and all of the above applications are hereby incorporated by reference.

GOVERNMENT INTEREST

The invention described herein may be manufactured, used and licensed by or for the United States Government.

BACKGROUND OF THE INVENTION

Quantum imaging is a new science that is developing new technology such as Quantum Ghost Imaging (QGI) to exploit quantum optical information. QGI increases versatility in imaging objects of interest. The imaging is adaptable to adverse imaging situations and there is a benefit to exploiting quantum optical information to image objects through partially obscuring media, i.e., optical turbulence, obstructions, smoke, and fog. Imaging through obscuring media is difficult; such as the difficulty of driving in foggy weather.

Quantum entanglement is a quantum mechanical phenomenon in which the quantum states of two or more quantum particles are linked together such that the quantum state of one quantum particle appears to interact with its counterpart; even though the individual quantum particles may be spatially separated. This apparent interconnection leads to correlations between observable physical properties of remote systems, since the interaction of the remote system with quantum state of one of a pair can be observed through observation of the counterpart. For example, according to quantum mechanics, the spin of a quantum particle is indeterminate until such time as some physical intervention, is made to measure the spin; which, in general, could equally be spin-up or spin-down. However, when two members of an entangled pair are measured, one will always be spin-up and the other will be spin-down, regardless of the distance between the two particles. It is normally taught in quantum theory that no hidden variable theory can account for these results of quantum mechanics. The statistics of multiple measurements must generally relate to an inequality (called Bell's inequality), which is violated both by quantum mechanical theory and experimental results.

The non-classical two-photon interaction or quantum entanglement was described by Albert Einstein et al. (Einstein, Podolsky, Rosen paradox), "Can Quantum-Mechanical Description of Physical Reality Be Considered Complete?" Physical Review, Volume 47, May 15, 1935, pgs. 777-800. The paradox of quantum entanglement, as described therein, relates to the concept that as a result of the process of measurement of a first system, using quantum mechanics, two different, physical quantities are obtainable in the second system, despite the fact that at the time of the measurements, the two systems no longer interact and the second system is not disturbed in any way by the first. Einstein, et al, were unable to reconcile this quantum mechanical description of reality with the so-called classical physics determination that no "real" change can take place in the second system as a consequence of anything that may be done to the first system after the two systems no longer interact.

The theoretical work reported by Klyshko in "Combined EPR and Two-Slit Experiments: Interference of Advanced Waves", Physics Letters A, Volume 132, number 6.7, pp. 299-304 (1988) see also, Sov. Phys. Usp. 31, 74 suggested a non-classical two-photon interaction could exist.

The first two-photon imaging experiment was reported by Pittman et al., in "Optical Imaging by Means of Two-photon Quantum Entanglement," Physical Review, A. Vol. 52, No 5, November 1995. According to the Pittman article, a two-photon optical imaging experiment was performed to test the two-particle entanglement as described by Albert Einstein et al. (Einstein, Podolsky, Rosen), referenced above, to determine if there was a correlation in position and in momentum for an entangled two-photon system; using "test beam or path" and "reference beam or path" photon pairs. Specifically, an aperture placed in front of a fixed detector was illuminated by a signal beam through a convex lens. A sharp magnified image of the aperture was found in the coincidence counting rate when a mobile detector was scanned in the transverse plane of the reference beam at a specific distance in relation to the lens. The experiment was named "ghost imaging" due to its surprising nonlocal feature.

Additional experiments are reported in Pittman, et al. "Optical Imaging by Means of Two-Photon Entanglement," Phys. Rev. A, Rapid Comm., Vol. 52, R3429 (1995) and ghost interference by Strekalov, et al, "Observation of Two-Photon 'Ghost' Interference and Diffraction," Phys. Rev. Lett., Vol. 74, 3600 (1995), which together stimulated the foundation of quantum imaging in terms of multi-photon geometrical and physical optics.

Boto and colleagues (Boto, Agedi, et al.), in "Quantum Interferometric Optical Lithography: Exploiting Entanglement to Beat the Diffraction Limit", Physical Review Letters, Volume 85, Number 13, 25 Sep. 2000, The American Physical Society, pgs. 2733-2736, developed an entangled multi-photon system for sub-diffraction-limited, imaging lithography and proposed a heuristic multiphoton absorption rate of a "noon" state and proved that the entangled N-photon system may improve the spatial resolution of an imaging system by a factor of N, despite the Rayleigh diffraction limit. The working principle of quantum lithography was experimentally demonstrated by D'Angelo, Milena, et al., in "Two-Photon Diffraction and Quantum Lithography", Physical Review Letters, Volume 87, Number 1, Jul. 2, 2001, pgs. 1-4, by taking advantage of an entangled two-photon state of spontaneous parametric down-conversion. Applications relating to quantum entanglement have been described, inter alia, in a series of patent applications by the present inventors.

Quantum-inspired Ghost-imaging, as used herein, refers to techniques such as those disclosed in U.S. Pat. No. 7,536,012 ('012 Patent), to R. Meyers and K. Deacon, entitled "Entangled Quantum Communications and Quantum Imaging," filed Jul. 28, 2004 (provisional filing date Aug. 6, 2003). The '012 Patent discloses, inter alia, an apparatus for generating a shared quantum key between a sender and a receiver comprising a sending apparatus which generates entangled photon pairs, and a receiving apparatus. The shared quantum key is generated from stochastic temporal coincidences between sender photon detection data and receiver photon detection data shared over the communication link. The '012 Patent further discloses an apparatus for a mask image transmission from a sender to a receiver with the sending apparatus including a source of entangled photons providing an entangled beam, a beamsplitter, a mask generator, and a beam recombiner, the entangled beam being incident on the beamsplitter, the beamsplitter providing a first beam which illuminates the mask, and a second beam which does not interact with the mask, the beam recombiner combining the first beam and the second beam into a transmitted beam which is then sent to the receiving apparatus. The receiving apparatus comprises a receiver beamsplitter, a first receiver detector for providing first receiver data, a second receiver detector for providing second receiver data, and a coincidence circuit. The transmitted beam is split by the receiver beamsplitter into a first receiver beam incident on the first receiver detector, and a second receiver beam incident on the second receiver detector. The coincidence circuit reconstructs the image from determined coincidences between the first receiver data and the second receiver data.

FIG. 1 is a prior art Lidar (Light. Detection and Ranging), sometimes referred to as laser radar. Light transmitted by a laser 11 is directed at a target area (not shown) and the back scattered (or reflected) light is received by an optical telescope mirror 2. A light guide 3 transmits the light to a detector 4 and the results are recorded on recorder 5 converted to logged data files and stored in a computer 20, which also operates (or fires) the laser.

For ease of understanding, the terminology "test path" may be used to designate the path or beam of the photon(s) entering, the object or target area. The terminology "reference path" will be used to designate the beam or path that the reference photon(s) travels.

Quantum imaging has so far demonstrated two peculiar features: (1) reproducing ghost images in a "nonlocal" manner, and (2) enhancing the spatial resolution of imaging beyond the diffraction limit. Both the nonlocal behavior observed in the ghost imaging experiment and the apparent violation, of the uncertainty principle explored in the quantum lithography experiment are due to the two-photon coherent effect of entangled states, which involves the superposition of two-photon amplitudes, a nonclassical entity corresponding to different yet indistinguishable alternative ways of triggering a joint-detection event in the quantum theory of photodetection as articulated by Glauber in "The Quantum Theory of Optical Coherence," Physical Review, Volume 130, Number 6, pp. 3529-2539, Jun. 15, 1963, and "Coherent and Incoherent States of the Radiation Field", Physical Review, Volume 131, Number 6, 15, pp. 2766-2788, September 1963. The nonlocal superposition of two-photon states may never be understood classically. For further discussion, see U.S. application Ser. No. 12/330,401, hereby incorporated by reference. The ongoing lack of theoretical understanding of ghost imaging has hampered efforts to develop reflective ghost imaging systems for practical field uses in such fields as satellite, field, medical and research imaging. Moreover, there exists a need for a system using ghost image where feedback or measurement is not possible at the target area.

Traditionally, imagers have collected two dimensional information on objects in the field of view. Addressing the additional need for range, Ladar systems have been developed to identify the range information at each pixel thus extending images to three dimensions as disclosed in greater detail in "Characterization of InGaAs self-mixing detectors for chirp, amplitude modulated LADAR (CAML)" by Keith Alibertia, et al. U.S. Army Research Laboratory, 2800 Powder Mill Road Adelphi, Md. 20783, hereby incorporated by reference.

SUMMARY OF INVENTION

A method for generating a series of frames of a subject comprising measuring light reflected from the subject into at least one first receiver at first points in time receiving spatial information relating to the light source illumination independent of interaction with the subject at second points in time into at least one second receiver, at least some of second points occurring before or after the first points in time; transmitting a measured value from the at least one first receiver to a processor; transmitting the spatial information relating to the light source illumination from a second receiver to a processor; correlating the measured values from the at least one first receiver at the first points in time with the spatial information derived from the at least one second receiver at the corresponding second points in time; and creating frames of a subject. The second points in time may optionally occur before or after the first points in time within predetermined time intervals in a range from approximately one femtosecond to approximately one or more seconds after the first points in time.

A preferred embodiment comprises a system for creating images of a subject illuminated by a incoherent, partially coherent, chaotic or entangled light source comprising: at least one processor for processing information; at least one first receiver for receiving light influenced by the subject operatively connected to the processor; the at least one first receiver transmitting to the at least one processor measured values devoid of spatial information at first predetermined time intervals; at least one second receiver adapted to receive light from an incoherent, partially coherent, chaotic or entangled light source, the at least one second receiver being operatively connected to the processor; the at least one second receiver operating to receive and transmit spatial information regarding the light source at second time intervals, at least some of the second time intervals occurring before or after the first time intervals; the spatial information regarding the light source being devoid of information concerning the subject; the at least one processor operating to correlate the measured values from the at least one first receiver at the predetermined intervals of time with the spatial information derived from the at least one second receiver to create images of the subject. Optionally, the images of the subject are a series of frames which form a motion picture or video. Optionally, the at least one of the first and second time intervals are unevenly spaced.

Another preferred embodiment system for creating images of a subject illuminated by a incoherent, partially coherent, chaotic or entangled light source comprises at least one processor for processing information; at least one first receiver for receiving light reflected from the vicinity of but absent reflections directly from the subject without spatial information; the at least one first receiver transmitting to the at least one processor measured values devoid of spatial information at first predetermined time intervals; at least one second receiver adapted to receive light from an incoherent, partially coherent, chaotic or entangled light source, the at least one second receiver being operatively connected to the processor; the at least one second receiver operating to receive and transmit spatial information regarding the light source at second time intervals, at least some of the second time intervals being advanced before or delayed after the first time intervals; the spatial information regarding the light source being devoid of information concerning the subject; the at least one processor operating to correlate the measured values from the at least one first receiver with the spatial information derived from the at least one second receiver to create images of the subject.

Optionally, the preferred embodiments may include at least one first receiver collecting only the amount of light reflected from the vicinity of but absent reflections from subject and not recording information concerning the internal features, outline or dimensions of the vicinity of the subject.

Optionally, the at least one second receiver collects spatial information from the light source which is transmitted to the at least one processor and the at least one processor creates the internal features, outline or dimensions of the subject based only on the spatial information of the light source and the amount of light measured by the at least one first receiver during corresponding advanced or delayed time interval.

An embodiment of the present invention can be used in conjunction with 3-D images from photons that have not interacted with object being imaged. As an example, can be used to detect 3D features of objects which absorb but reflect only minimal light. An embodiment of the present invention provides 3-D Image generation by photons that have never directly interacted with the object being 3-D imaged. Optionally, other methods such as multiplexing can be used to increase frequency of pulses. Optionally, to improve imaging with fewer pulses modern compressive imaging techniques can be used. These may provide approximately a factor of ten decrease in measurements needed.

BRIEF DESCRIPTION OF THE DRAWINGS

FIG. 2 illustrates a flow chart of an exemplary relative-time difference movie process.

FIG. 3 illustrates a flow chart of an exemplary Relative-Time Difference=0 movie process.

FIG. 16A illustrates a Ghost image computed using a 0 frame time shift under non turbulent conditions.

FIG. 16B illustrates a Ghost Image computed using −10 frame time shift under non turbulent conditions.

FIG. 16C illustrates a Ghost Image computed using +10 frame time shift under nonturbulent conditions.

FIG. 17A illustrates a Ghost Image computed using −15 frame time shift under non turbulent conditions.

FIG. 17B illustrates a Ghost Image computed using +15 frame time shift under non turbulent conditions.

FIG. 18A illustrates a Ghost Image computed using −20 frame time shift under non turbulent conditions.

FIG. 18B illustrates a Ghost Image computed using +20 frame time shift under non turbulent conditions.

FIG. 19A illustrates a Ghost Image computed using 0 frame time shift under turbulent conditions.

FIG. 19B illustrates a Ghost Image computed using −5 frame time shift under turbulent conditions.

FIG. 19C illustrates a Ghost Image computed using +5 frame time shift under turbulent conditions.

FIG. 20A illustrates a Ghost Image computed using −10 frame time shift under turbulent conditions.

FIG. 20B illustrates a Ghost Image computed using +10 frame time shift under turbulent conditions.

FIG. 21A illustrates a Ghost Image computed using −15 frame time shift under turbulent conditions.

FIG. 21B illustrates a Ghost Image computed using +15 frame time shift under turbulent conditions.

FIG. 26 is an Illustration of the time/frame measurements between the Reference and Target measurements with a 0 time offset or frame offset

DESCRIPTION OF THE PREFERRED EMBODIMENTS

Figure 1:
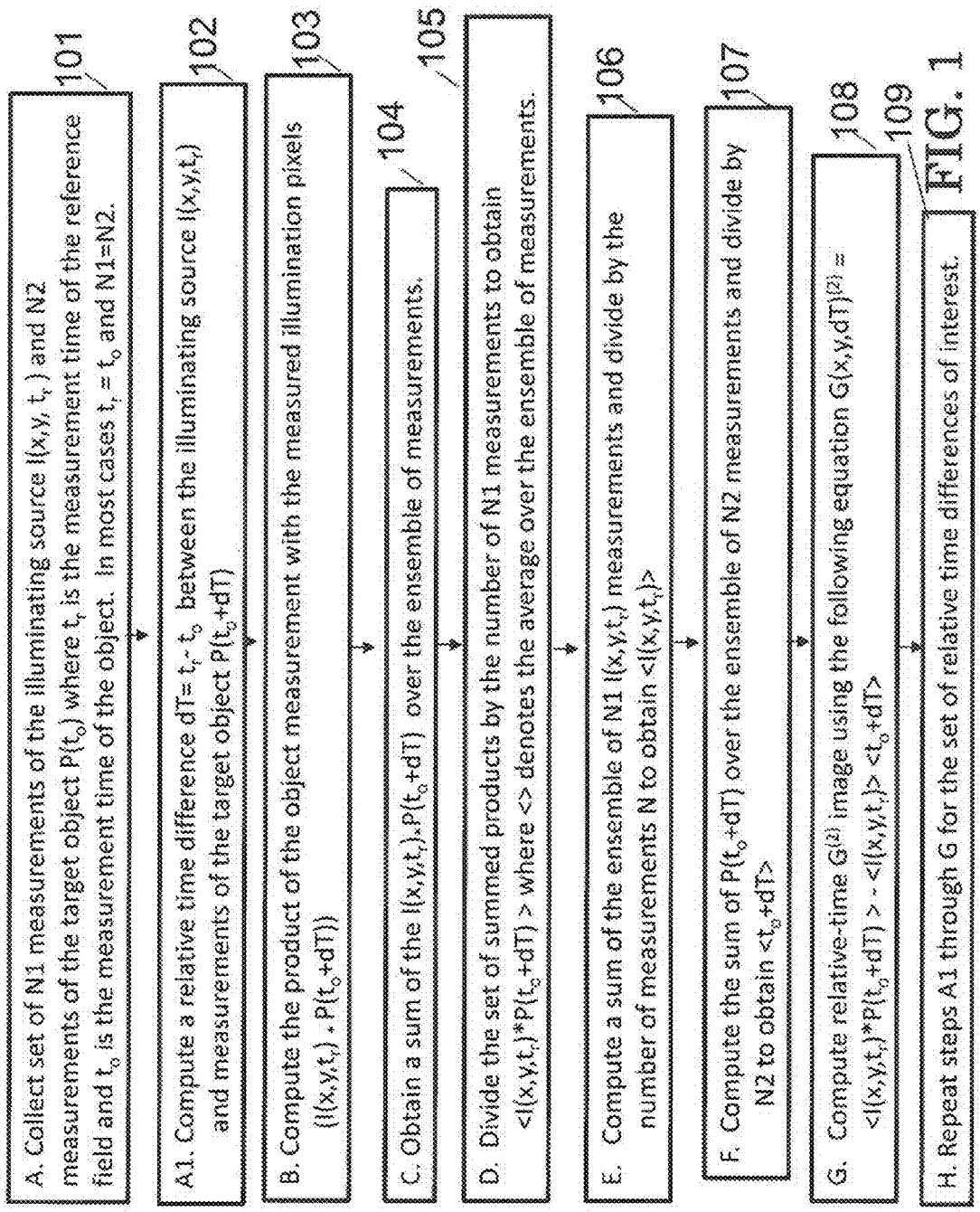
FIG. 1 is a flow chart illustrating exemplary relative-time difference Process using a $G^{(2)}$ technique.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. The terms lidar, Lidar, Ladar and ladar are equivalent for purposes used herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures.

As used herein the terminology target path, object path, target beam, object beam, test path or test beam refers to the beam or path directed to the target or object space and or area. The terminology reference path or beam relates to the photon path or beam which is detected and/or measured. The terminology is not intended to limit the scope of the invention inasmuch as other terminology could be used to similarly describe similar operating systems.

Embodiments of the present invention are described herein with reference to cross-section illustrations that are schematic illustrations of idealized embodiments of the present invention. As such variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As used herein the terminology object or target space means an area or space in which a target may or may not be detected. In medical applications, the target may be a body or a component of the body. In environmental applications, the target area may be an area in space which is subject to surveillance. The target subject to surveillance may be an aerial vehicle or the like, a satellite, or an object in space. The target area may also be at ground level and involve areas of the ground or landscape. Accordingly, the invention may be used for purposes of mapping or imaging an area on the ground.

In application Ser. No. 12/343,384, to R. Meyers and K. Deacon, entitled "Method and System for Quantum imaging Using Entangled Photons Pairs" filed Dec. 23, 2008, hereby incorporated by reference, there is disclosed a system using entangled photon pairs in which a first part of entangled pair is sent towards a target while a second part is sent along a reference path for future measurement. If the first part of the entangled photon pair is absorbed or reflected by the target, it will affect a property (e.g., spin, polarization, transverse momentum, angular momentum, color) of the photon. The influence by the target is also reflected in the reference photons. By knowing the time of flight, one can determine the distance that the reference photon travels. Similarly, by identifying reference photons which exhibit changed characteristics (such as color, spin, polarization), one can determine the possible existence of a target or object in the target space; i.e., it can determined whether it is likely or unlikely that there was a target in the space based upon the reference path entangled photon that travelled during the same time period.

FIG. 1 is a flow chart illustrating exemplary relative-time difference process using a $G^{(2)}$ technique. The time differences may optionally be uneven. In Box 101, a set of N1 measurements is collected of the illuminating source $I(x, y, t_r)$ and N2 measurements of the target object $P(t_o)$ where $t_r$ is the measurement time of the reference field and to is the measurement time of the object. In most cases $t_r=t_o$ and N1=N2. In Box 102, a relative time difference $dT=t_r-t_o$ between the illuminating source $I(x,y,t_r)$ and measurements of the target object $P(t_o+dT)$ is computed. In Box 103, the product of the object measurement with the measured illumination pixels $(I(x,y,t_r)*P(t_o+dT))$ is computed. In Box 104, a sum of the $I(x,y,t_r)*P(t_o+dT)$ over the ensemble of measurements is obtained. In Box 105, the set of summed products id divided by the number of N1 measurements to obtain $<I(x,y,t_r)*P(t_o+dT)>$ where $<>$ denotes the average over the ensemble of measurements. In Box 106, a sum of the ensemble of N1 $I(x,y,t_r)$ measurements is computed and divided by the number of measurements N to obtain $<I(x,y,t_r)>$. In Box 107, the sum of $P(t_o+dT)$ is computed over the ensemble of N2 measurements and divide by N2 to obtain $<t_o+dT>$. Box 108, the relative-time $G^{(2)}$ image is computed using the following equation $G(x,y,dT)^{(2)}=<I(x,y,t_r)*P(t_o+dT)>-<I(x,y,t_r)><t_o+dT>$. In Box 109, the steps in Boxes 102 through 108 are repeated for the set of relative time differences of interest.

Referring now to FIG. 2 (an exemplary relative-time difference movie process) in Box 110, for a N frame video/movie a set of M1 measurements of the illuminating source $I(x,y,t_r)$ and M2 measurements of the target object $P(t_o)$ are collected; in most cases $t_r=t_o$; N<=M1=M2. In Box 111, the series of dT is computed for which to compute a frame of the movie. Typically dT, in measurement units, would range from −N/2 to ±N/2 in Box 112, the Relative-Time difference frame of the video/movie is computed using the process outlined in FIG. 1. In Box 113, the frames computed at each specified dT are stored in sequential order, e.g. frame 1 is a function of dT=−N/2 to frame dT=N/2, in a playable format such as AVI or MPG. In Box 114, the sequence of stored frames are stored as a movie (or converted to a movie)

FIG. 3 a flow chart of an example methodology where the relative-time difference is equal to zero for a movie process. At Box 115, for a movie that would consist of N frames, a set of M1 measurements of the illuminating source $I(x,y,t_r)$ is collected and M2 measurements of the target object $P(t_o)$ are collected; in most cases $t_r=t_o$; N<=M1=M2. In Box 116, the series of M1,M2 measurements is partitioned into N sequential groups, i.e. assuming M1=M2=10 measurements and N=5 frames for the movie; group 1 could consist of measurements 1 and 2 and group 2 would consist of measurements 3 and 4, . . . , group 5 would consist of measurements 9 and 10. In Box 117, dT is sot to dT=0 and the Relative-Time difference frame of the movie is computed using the process outlined in FIG. 1. In Box 118, the frames computed for each grouping of measurements 1 to N are stored in sequential order in a playable format such as AVI or MPG. Box 119 represents the sequence of stored frames available as a movie.

Referring now to U.S. Pat. No. 8,242,428, issued from U.S. patent application Ser. No. 12/819,602, on Aug. 14, 2012, and entitled Method and System for LIDAR Using Quantum Properties," (filed Aug. 14, 2012) (hereinafter '428 Patent), a preferred embodiment utilizes a 3D Quantum-Image Ladar capability that is capable of imaging objects in three dimensions through adverse imaging scenarios. The preferred embodiments described in the '428 patent exploit the Ladar time resolution and photon source capability as well as the quantum-imaging optical information processing to overcome increased scattering challenges. In applications such as this, Quantum-imaging exploits quantum optical information using photon coincidence measurements. In this Quantum-imaging, photon energy is essentially put onto a target and a bucket detector measures reflected and scattered photons. The photon energy that is put onto the target by the ladar is part of what is referred to as quantum ladar. By combining ladar with time resolving ghost imaging technique, the quantum ladar three dimensional image is produced.

Figure 5:
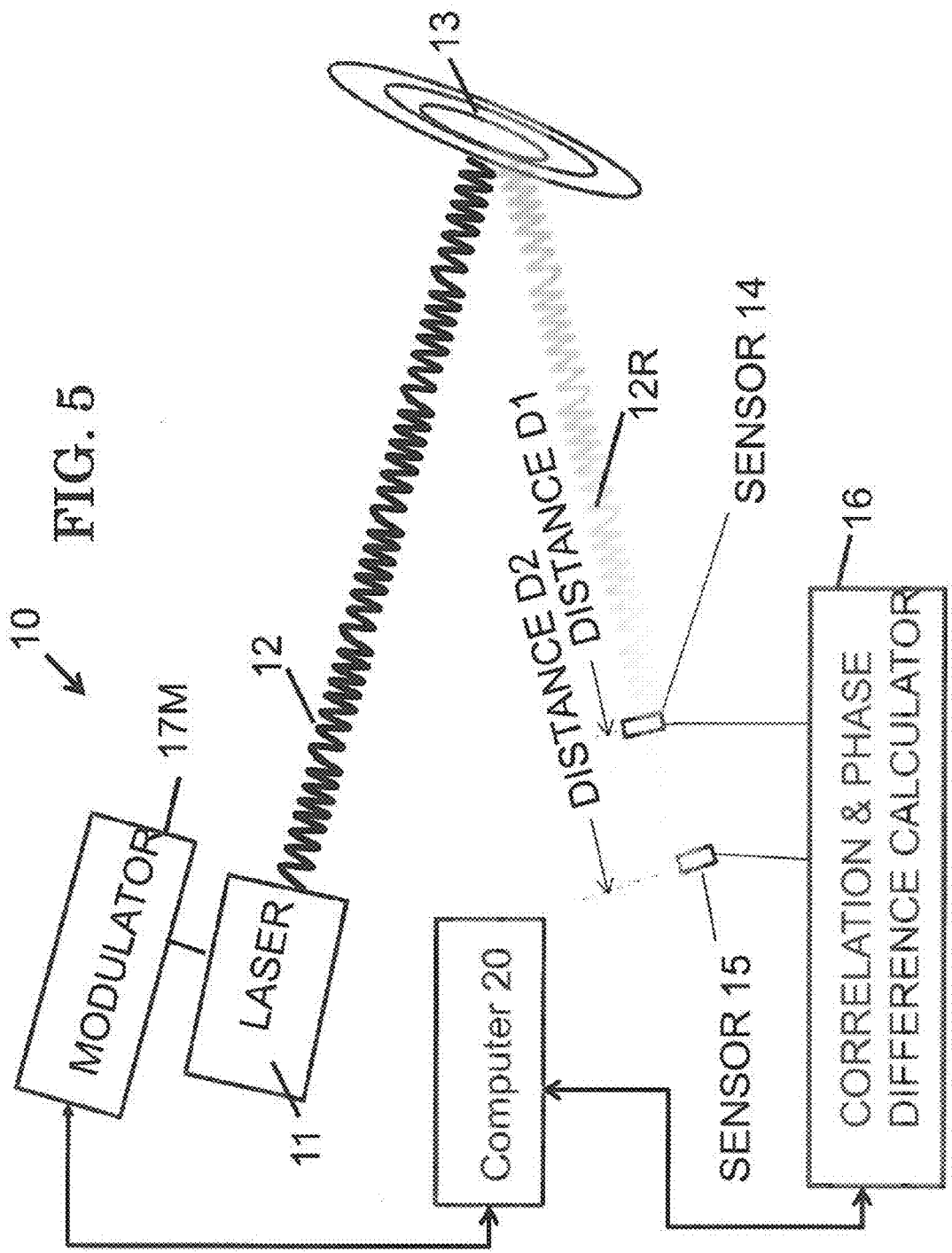
FIG. 5 is schematic system block diagram of a preferred embodiment according to the principles of the present invention comprising, inter alia, a modulator 17M.

In a preferred embodiment of FIG. 5, also described in FIG. 2 of the '428 patent, the ladar 10 will send out successive pulses of light 12 according to an appropriate changing beam formation and composition to become incident (or illuminate) the target object 13 and surrounding objects and then scatter and/or reflect. A modulator 17M may be used to modulate the spatial and temporal profile of the light from the laser 11. The quantum ladar will send out successive pulses of light according to an appropriate changing beam formation and composition to become incident on the target object and surrounding objects and then scatter and reflect. Between successive pulses a single pixel bucket detector will receive reflected and scattered photons as a function of time from each pulse. Successive pulses are divided by the period $2\pi$. A lens may be used to collect and focus the return photons onto the photon bucket detector.

In the preferred embodiment shown in FIG. 5, a laser 11 sends out an amplitude modulated speckle light pattern that reflects and scatters due to target object 13. The returned and scattered light is collected by a first detector or sensor 14 at a distance D1. Detector 14 may be a bucket detector. A second detector or sensor 15, which also may be a bucket detector, is positioned at a distance D2 and receives scattered and reflected light. In a preferred embodiment, D1 is not equal to D2. The intensity versus time signals from the two detectors are compared to compute a phase shift between the two received signals at the first and second detectors 14 and 15. The phase shift is proportional to distance and unambiguous us to a 2 pi value of the phase shift since in the case of a periodic signal having a period of 2 pi, the signal repeats after 2 pi. The image is computed as a function of equivalent time delay from the laser to the object and back to the bucket detectors 14 and 15.

Figure 4:
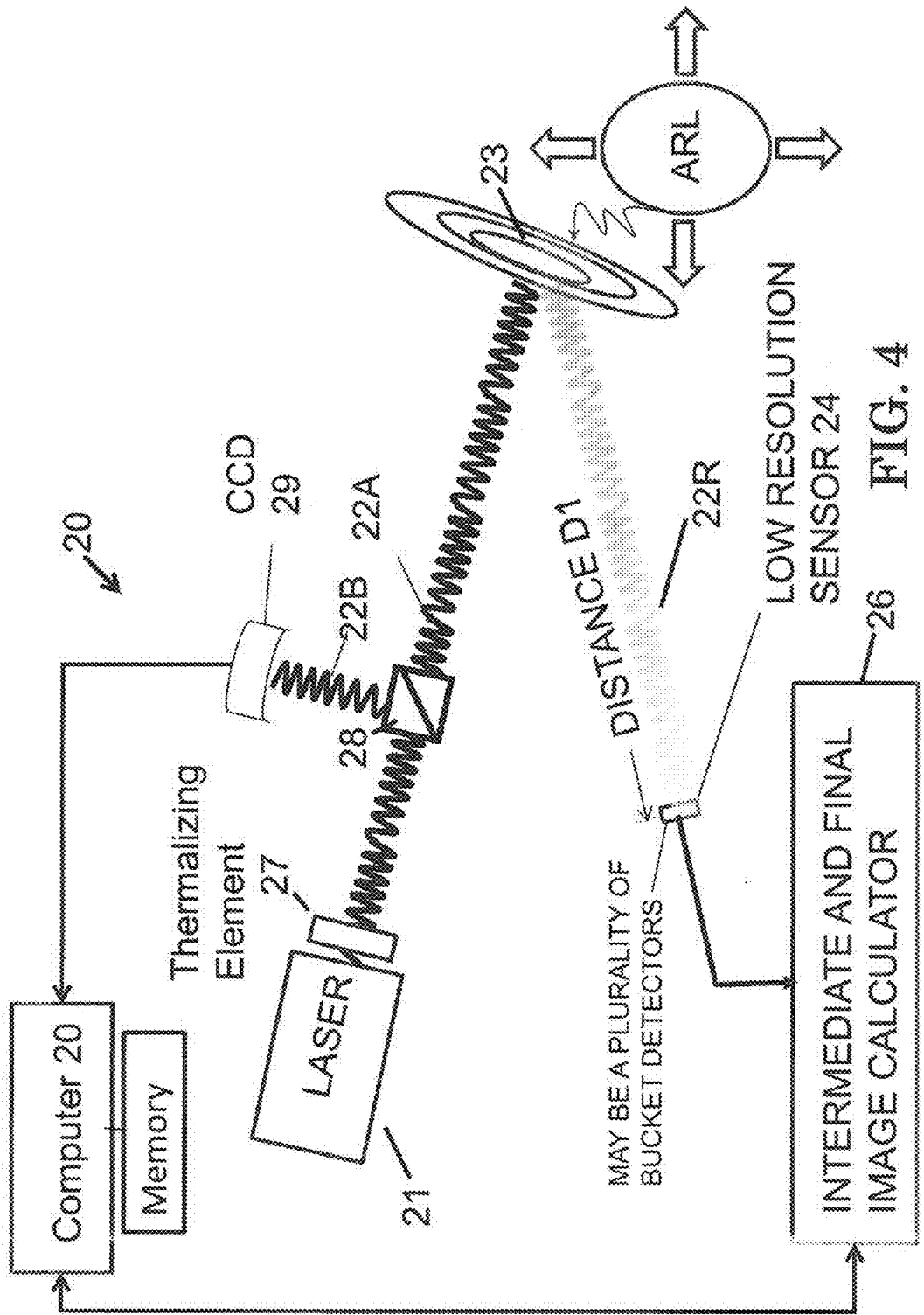
FIG. 4 is schematic system block diagram of a preferred embodiment according to the principles of the present invention comprising, inter alia, a thermalizing element 17T.
Figure 6:
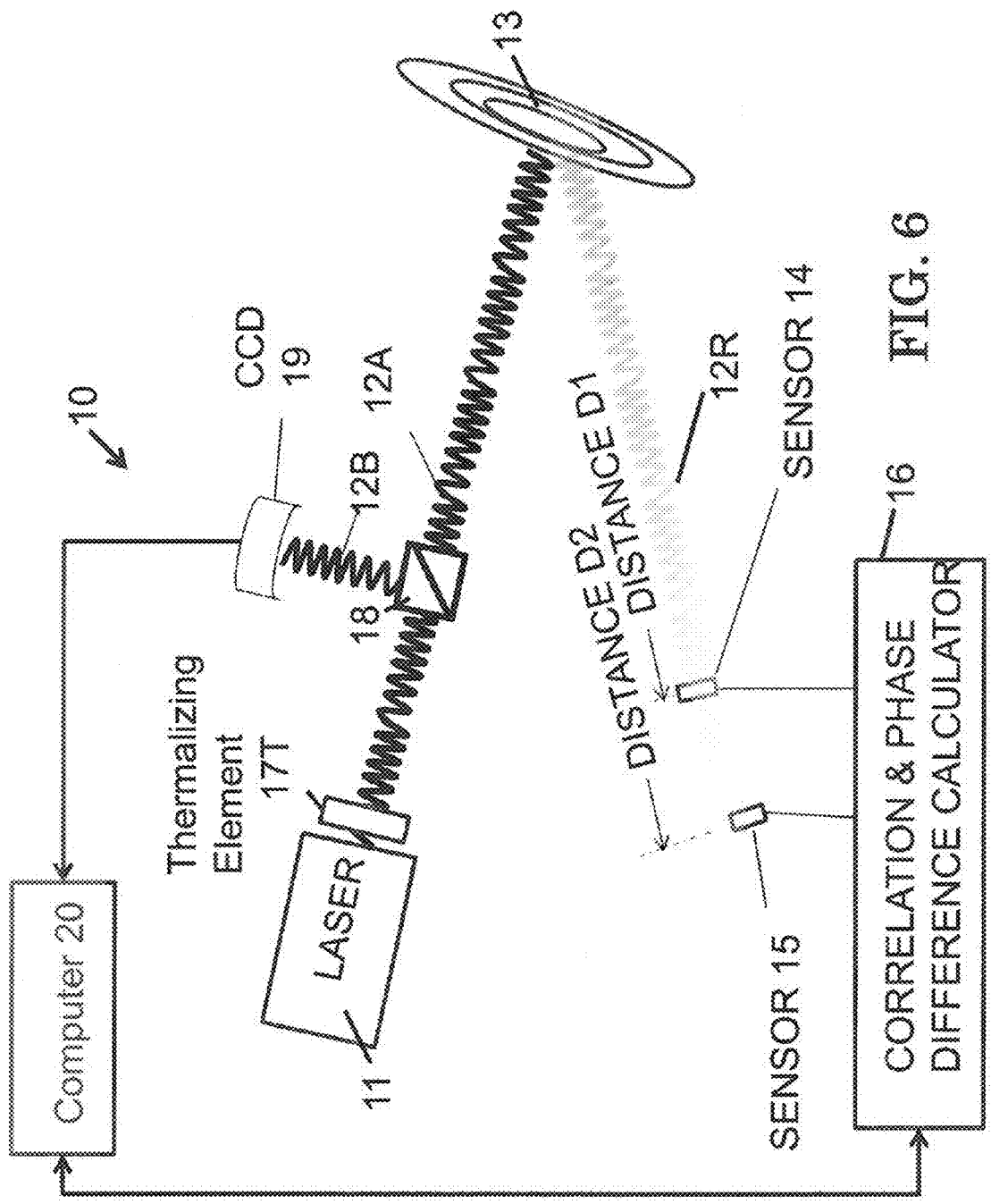
FIG. 6 is schematic system block diagram of a preferred embodiment according to the principles of the present invention comprising, inter alia, a thermalizing element 17T.

Shown in FIG. 4 and FIG. 6 (described in the '428 Patent in FIG. 3) are embodiments in which a laser 11 sends light through a thermalizing element 17T which creates a light pattern. A beam splitter 18 is used to split the beam from the laser 11 into a target path 12A and a reference path 12R. The pattern, of the beam is recorded by a charge coupled device (CCD) 19 or the like which records spatial information concerning the light pattern as discussed more fully in U.S. application Ser. No. 12/330,401, hereby incorporated by reference. In its simplest terms, CCD is a device for the movement of electrical charge from the detector area (19) to an area where the charge can be manipulated, for example conversion into a digital value. CCDs may be implemented as shift registers that move charge between capacitive bins in the device. The CCD device may be made up of semiconductors arranged in such a way that the electric charge output of one semiconductor charges an adjacent one. The CCD device may be integrated with an image sensor, such as a photoelectric device to produce the charge that is being read for digital imaging. The CCD device 19 may optionally be a camera, photodetector array or a photographic device capable of imaging the beam pattern 12B. The beam pattern comprising the spatial information concerning the light beam 12B is sent to computer 20. Light Beam 12A is directed to the target 13 and the returned and scattered light is collected by as first detector or sensor 14 at a distance D1. Detector 14 may be a bucket detector, or any kind of detector which has the capability of detecting a photon strike. In FIG. 6, a second detector or sensor 15, which also may be a bucket detector or any detector having the capability of detecting a photon strike, is positioned at a distance. D2 and receives scattered and reflected light. The detectors 14 and 15 are spaced a known distance apart so a phase shift can be computed based upon the speed of light, $\phi=(4\pi*r*f)/c$. Detectors 14 and 15 need not be alike; and either may be of a large variety of photo detectors well known to those of ordinary skill in the art. A feature of the preferred embodiments of FIGS. 5 and 6 is that the detectors 14 and 15 need not record spatial information regarding the target 13. Instead, spatial information is recorded by spatial detector 19. The spatial information recorded by spatial detector 19 is transmitted to the computer 20 which combines and correlates this spatial information with the coincidence data received from detectors 14 and 15. For example, the data recorded by a detector 14 or 15 may be transmitted to computer 20 in a form resembling that depicted in FIG. 4 of the '428 Patent, where roughly 200 normalized "bucket" measurements are represented.

The spatial information from detector 19 is combined with the coincidence information from the detectors 14, 15 in computer 20. Computer 20 may be a microprocessor, processor, multiprocessor, CPU, mainframe, or any computing element capable of combining the spatial information from the detector 19 with the coincidence information from detectors 14, 15. Further description of the coincidence detection feature is found in U.S. Pat. No. 7,536,012 and U.S. patent application Ser. No. 12/330,401, both of which are hereby incorporated by reference. Since the photonic information detected by detectors 14 and 15 need not encompass spatial information, but simply indicate the occurrence of a photon returned from the target 13, this capability facilitates the use of the preferred embodiment lidar systems in environments in which the returned photons may be impacted by environmental conditions such as fog, smoke, atmospheric particles and the like. In the preferred embodiments of FIGS. 7 and 6, D1 is not equal to D2. The intensity versus time signals from the two detectors are compared to compute a phase shift between the two received signals at the first and second detectors 14 and 15. The phase shift is proportional to distance and unambiguous us to a 2 pi value of the phase shift; since in the case of a periodic signal having a period of 2 pi, the signal repeats after 2 pi. The image is computed as a function of equivalent time delay from the laser to the object and back to the bucket detectors 14 and 15.

A quantum photon mathematical equation will project the reference light intensity from the initial, pulse to a down-beam position and intensity value. This will be combined with "bucket" photon information (such as that exemplified in FIG. 4 of the '428 Patent) for an ensemble of pulses to produce coincidence measurements needed for "ghost" Ladar imaging. The terminology "ghost" relates to the feature that the spatial information is not reflected from the target but is either derived from the modulation of the laser beam in FIG. 5 or the spatial information obtained through the use of beam splitter 18 and detector 19 which records spatial information from a beam which has not "seen" or illuminated the target.

Each time interval after initiation of a pulse will correspond to a range distance of an object. Since "ghost" imaging has a narrow depth of focus each object at each distance can be resolved based on their delay from the initial pulse. Ghost Ladar imaging of a complicated scene will render in focus all those parts of objects at a given range $r=ct/2$ where t is the time for a Ghost Ladar photon to travel to the object and return. Thus a 3-D scene can be constructed from slices of in-focus images returned at each t between pulses. The period between pulses can be delayed to cover all expected returns. After proof of concept, other methods such as multiplexing can be used to increase frequency of pulses. To improve imaging with fewer pulses modern compressive imaging techniques can be used. Compressive techniques facilitate approximations resulting in decreasing the number of measurements necessary.

The ability to correct structured information (e.g., speckles) and obtain accurate timing with many repetitions so as to create a sufficiently large ensemble of measurements is described further in U.S. Pat. No. 7,536,012 and U.S. patent application Ser. No. 12/330,401, both of which are hereby incorporated by reference.

Figure 7:
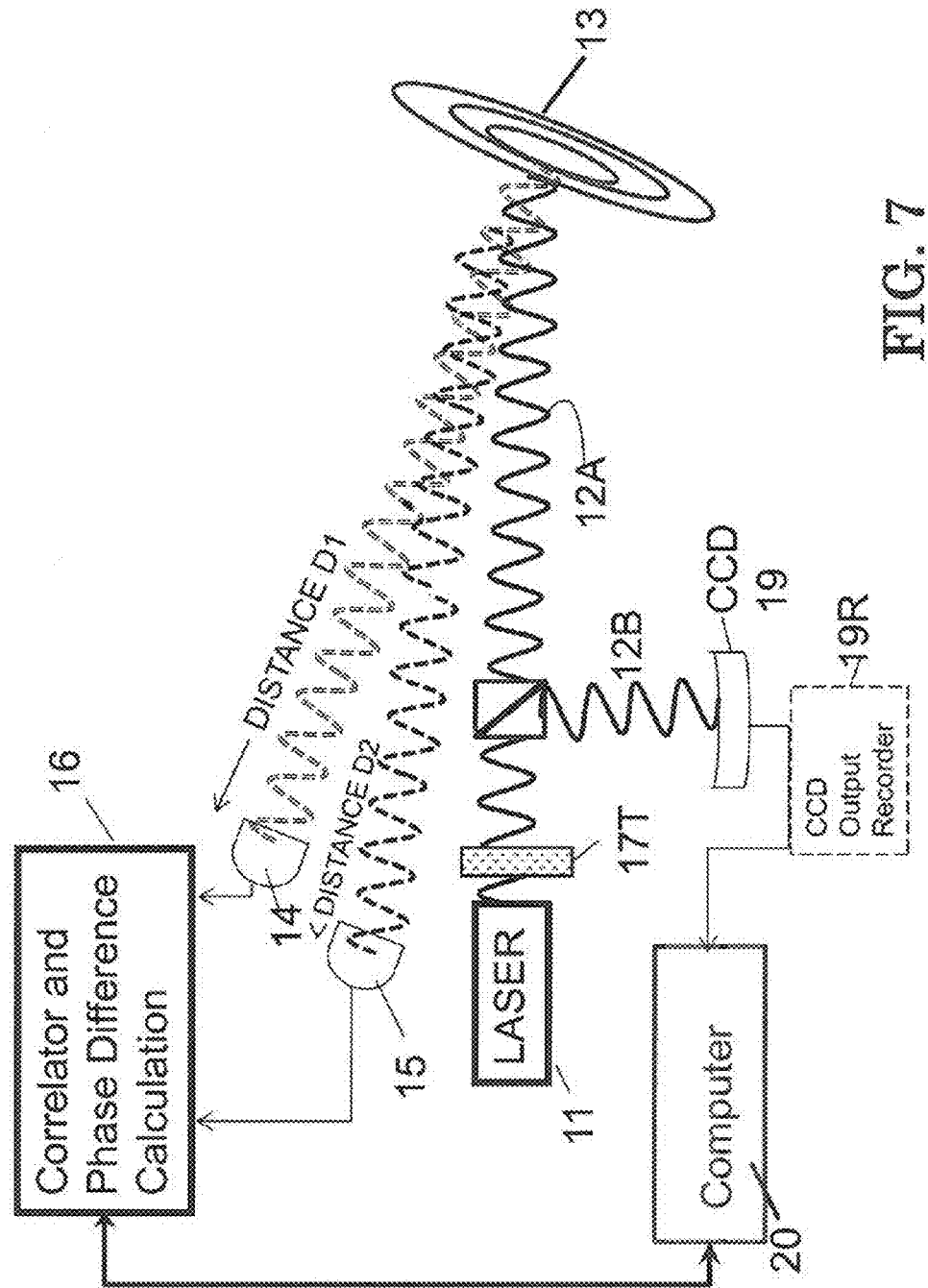
FIG. 7 is schematic system block diagram of a preferred embodiment according to the principles of the present invention comprising, inter alia, a thermalizer 17T and a CCD output recorder.

FIG. 7 (correlating at least in part to FIG. 5 of the '429 Patent) illustrates another preferred embodiment of a lidar system constructed in accordance with the principles of the present invention comprising a laser 11 from which a beam of photons passes through a thermalizing element 17T onto a beam splitter 18.

It should be noted that the calculation of the G(2) image may be accomplished by using optimization methods such as Compressive Sensing techniques.

FIG. 7 is an illustration of a preferred embodiment system which optionally uses entangled photon pairs in which a first part of entangled pair is sent towards a target 13 while a second part is sent along a reference path 12B. If the first part of the entangled photon pair is absorbed or reflected by the target, it will affect a property (e.g., spin, polarization, transverse momentum, angular momentum, color) of the photon. A preferred embodiment comprises a method and system for (a) detecting objects or targets which may or may not be nonreflective to electromagnetic radiation, and/or (b) generating an image of a subject or area, comprising generating an entangled photon pair beam; splitting the entangled photon pair beam into first and second parts; the first parts being directed in a first direction towards a first location, and the second parts being received into a measuring device; measuring the physical characteristics of the conjugate second parts to determine whether or not the first parts have encountered the presence or absence of an object at the first location in combination with the time that the first part takes to enter the first location. The method and system incorporate a photon beam in a reference path that never directly interacts with the object yet is determinative of presence or absence of an object at the first location. The splitting of the entangled photon pair beam occurs prior to the first parts being absorbed by said object, and the measuring of the characteristics of the conjugates occurs subsequent to the splitting of the entangled photon beam. The influence by the target is also reflected in the reference photons.

In FIG. 7 in a preferred embodiment, incoherent, partially coherent, chaotic or entangled light source is reflected from a subject target into a bucket detector which does not process spatial information and in effect, merely measures the "quantity" of light reflected from the subject into a plurality of bucket detectors 14, 15. A detector (CCD 19R) is a spatial detector illuminated by the light source. Using spatial information from the second detector in conjunction with the light measurement from the first detector, an image is generated using coincidence circuitry.

The spatial information from detector 19 is combined with the coincidence information from the detectors 14 in computer 20. Computer 20 may be a microprocessor, processor, multiprocessor, CPU, mainframe, or any computing element capable of combining the spatial information from the detector 19 with the coincidence information from detectors 14, 15. Further description of the coincidence detection feature is found in U.S. Pat. No. 7,536,012 and U.S. patent application Ser. No. 12/330,401, both of which are hereby incorporated, by reference. Since the photonic information detected by each particular detector 14, 15 need not encompass spatial information, but simply indicate the occurrence of a photon returned from the target 13, this capability facilitates the use of the preferred embodiment systems in environments in which the returned photons may be impacted by environmental conditions such as fog, smoke, atmospheric particles and the like.

A quantum photon mathematical equation will project the reference light intensity from the CCD 19. This will be combined with "bucket" photon information for an ensemble of pulses to produce coincidence measurements needed for "ghost" imaging. The terminology "ghost" relates to the feature that the spatial information is not reflected from the target but is either derived from the modulation of the laser beam not shown) or the spatial information obtained through the use of beam splitter and detector 19 which records spatial information from a beam which has not "seen" or illuminated the target.

Note that in FIG. 7, a portion of the beam 12B is diverted to a charge coupled device 19 (which may, for example be a photographic imaging device) which records spatial information concerning light beam 12B. The spatial information recorded by spatial detector 19 is transmitted to the computer 20 which combines and correlates this spatial information with the coincidence data received from detectors 14 and 15. For example, the data recorded by a detector 14 or 15 may be transmitted to computer 20 in a form resembling that depicted in FIG. 4 of the '428 Patent, where roughly 200 normalized "bucket" measurements are represented.

The spatial information from detector 19 is combined with the coincidence information from the detectors 14, 15 in computer 20. Computer 20 may be a microprocessor, processor, multiprocessor, CPU, mainframe, or any computing element capable of combining the spatial information from the detector 19 with the coincidence information from detectors 14, 15. Further description of the coincidence detection feature is found in U.S. Pat. No. 7,536,012 and U.S. patent application Ser. No. 12/330,401, both of which are hereby incorporated by reference. Since the photonic information detected by detectors 14 and 15 need not encompass spatial information, but simply indicate the occurrence of a photon returned from the target 13, this capability facilitates the use of the preferred embodiment lidar systems in environments in which the returned photons may be impacted by environmental conditions such as fog, smoke, atmospheric particles and the like. In the preferred embodiment of FIG. 7 D1 is not equal to D2 and detectors 14 and 15 are positioned at different angles from the target 13. The embodiment of FIG. 7 may include a CCD 19R for recording spatial information.

Figure 8:
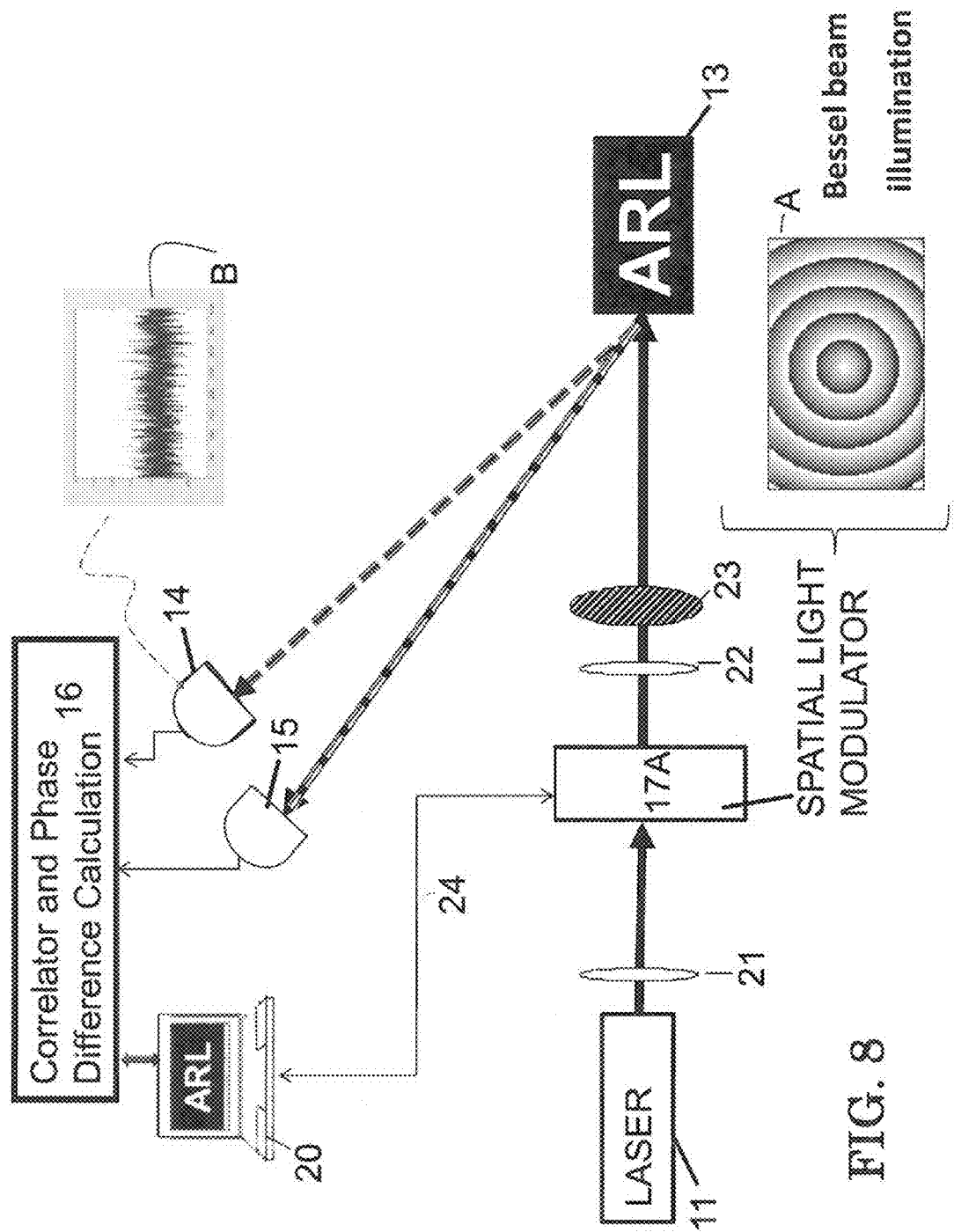
FIG. 8 is schematic system block diagram of a preferred embodiment according to the principles of the present invention comprising, inter alia, a spatial light modulator 17A.

FIG. 8 depicts a preferred embodiment wherein the beam from laser 11 passes through an optional expansion lens 21 into a spatial light modulator 17A. The spatial light modulator forms the beam pattern depicted in insert A of FIG. 8. This beam pattern is received by computer 20 by means of a path 24 which may be a variety of wireless transmission means or a conductor of electronic signals. The modified light beam optionally passes through a focusing lens 22 and polarizer 23 onto target 13. For ease of understanding exemplary target 13 is has the letters "ARL" shown thereon, but the target may be of any nature or configuration. As depicted in FIG. 8, measurements from the illumination patterns reflected and/or scattered off opaque target 13 are received by detectors 14 and 15. One pattern of bucket measurements is depicted in the insert B shown in FIG. 8. A correlation and phase difference calculation element 16 correlates the detection signals from detectors 14 and 15 to derive the three dimensional target information. Detectors 14 and 15 are at different distances D1 and D2 from the target. Generally speaking, knowing the speed of light and quantum properties of light, three-dimensional information concerning the target 13 is derived. However, in the case shown in FIG. 8, the information transmitted to computer 20 results in the imaging of the "ARL" target 13 on the computer 20.

Figure 9:
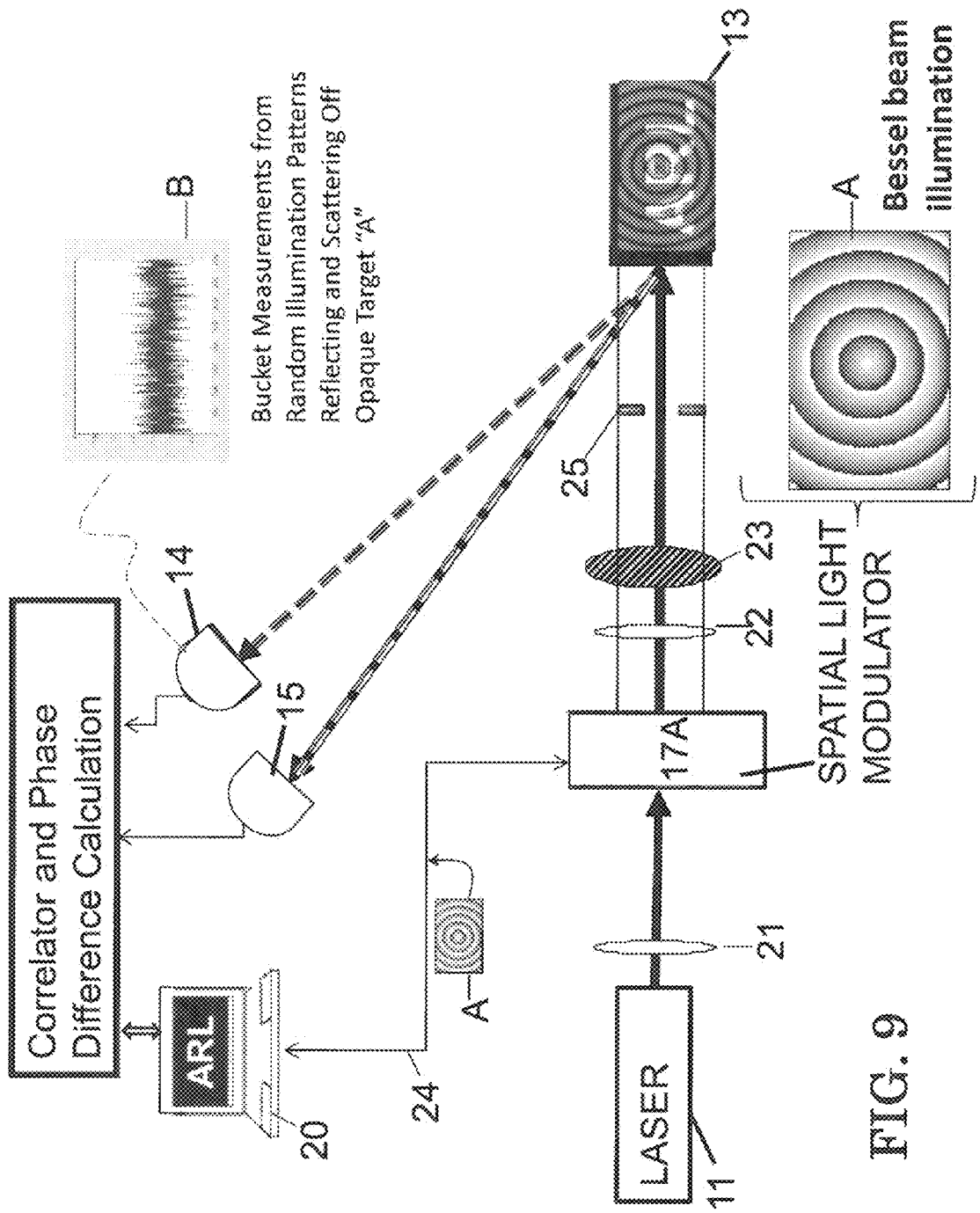
FIG. 9 is schematic system block diagram of a preferred embodiment according to the principles of the present invention comprising, inter alia, a spatial light modulator 17A and an aperture 25. The aperture diameter was 2 mm. The aperture may be 27.8 cm from the SLM and 73.7 cm from the target.
Figure 10:
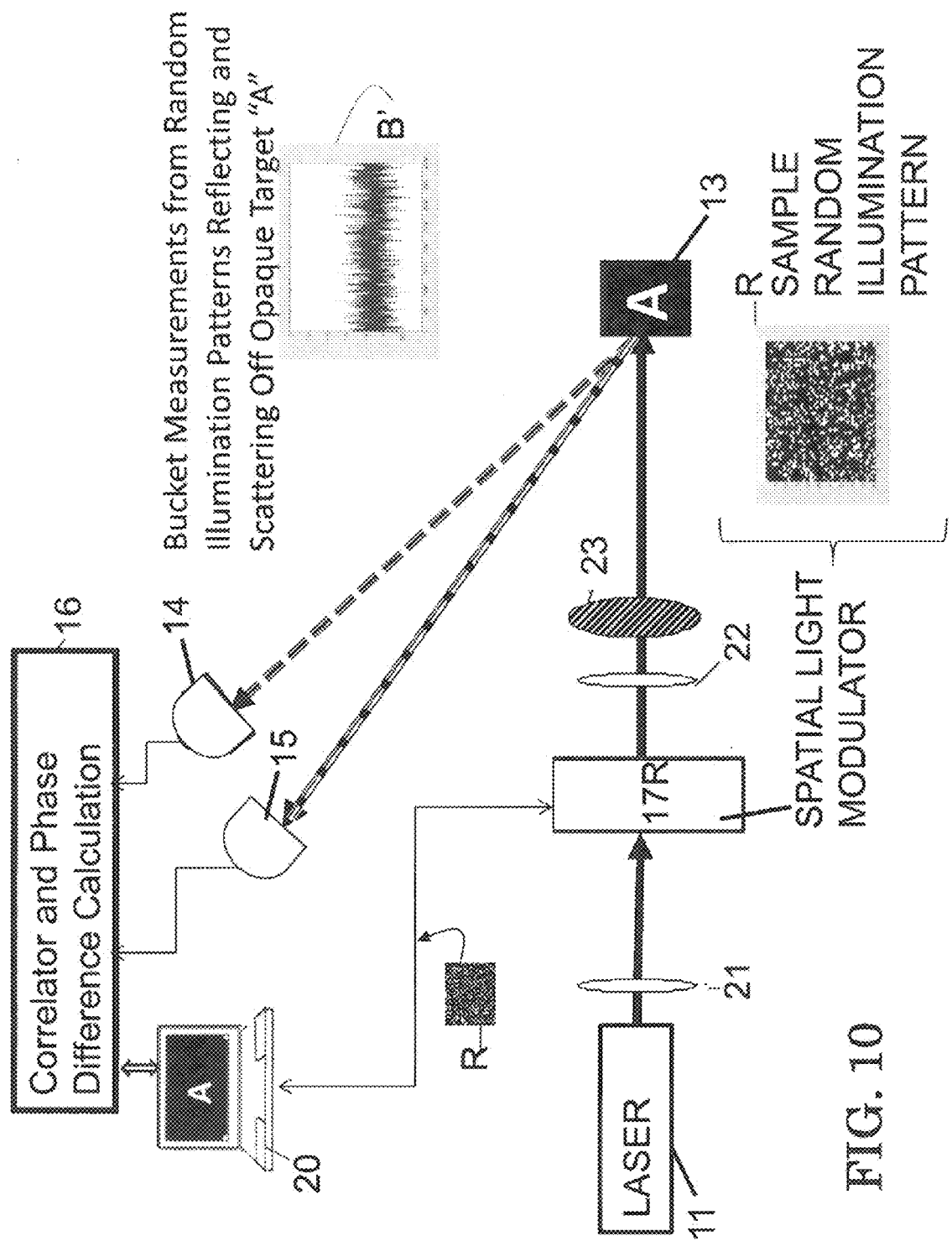
FIG. 10 is schematic system block diagram of a preferred embodiment according to the principles of the present invention comprising, inter alia, a spatial light modulator 17A further illustrating a random illumination pattern.

FIG. 9 (correlating in part to FIG. 7 of the '428 Patent) depicts a preferred embodiment wherein the beam from laser 11 passes through an optional expansion lens 21 into a spatial light modulator 17A. The spatial light modulator forms the Bessel beam illumination pattern depicted in insert A of FIG. 9. This beam pattern is received by computer 20 by means of a path 24 which may be a variety of wireless transmission means or a conductor of electronic signals. The modified light beam optionally passes through a focusing lens 22 and polarizer 23 onto target 13. For ease of understanding exemplary target 13 is has the letters "ARL" shown thereon, but the target may be of any nature or configuration. As depicted in FIG. 9, measurements from the illumination pattern reflected and/or scattered off opaque target 13 are received by detectors 14 and 15. A correlation and phase difference calculation element 16 correlates the detection signals from detectors 14 and 15 to derive the three dimensional target information. Detectors 14 and 15 are at different distances D1 and D2 from the target. Generally speaking, knowing the speed of light and quantum properties of light, three-dimensional information concerning the target 13 is derived. However, in the case shown in FIG. 9, the information transmitted to computer 20 results in the imaging of the "ARL" target 13 on the computer 20. FIG. 9 includes the additional light modulator 25 which causes the represented effect depicted on target element 13 of FIG. 9, FIG. 10 (correlating to FIG. 8 of the '428 Patent) depicts a preferred embodiment wherein the beam from laser 11 passes through an optional expansion lens 21 into a spatial light modulator 17A. The spatial light modulator 17R forms the representative random illumination pattern depicted in insert R of FIG. 9. This beam pattern is received by computer 20 by means of a path 24 which may be a variety of wireless transmission means or a conductor of electronic signals. The modified light beam optionally passes through as focusing lens 22 and polarizer 23 onto target 13. For ease of understanding exemplary target 13 is has the letters "A" shown thereon, but the target may be of any nature or configuration. As depicted in FIG. 10, measurements from the illumination pattern reflected and/or scattered off opaque target 13 are received by detectors 14 and 15. A correlation and phase difference calculation element 16 correlates the detection signals from detectors 14 and 15 to derive the 3-D target information. Detectors 14 and 15 are at different distances D1 and D2 from the target. Generally speaking, knowing the speed of light and quantum properties of light, three-dimensional information concerning the target 13 is derived. However, in the case shown in FIG. 10, the information transmitted to computer 20 results in the imaging of the "A" target 13 on the computer 20. FIG. 10 may include the additional light modulator 25 (not shown).

In each of the embodiments discussed herein, the laser 11 may be, for example, a 1.55-μm semiconductor laser diode operating at 1-mW average power modulated 2-mW peak-to-peak. Although only two receivers or detectors 14 and 15 are depicted, the receiver electronics may encompass a single pair of detectors or a linear array of, for example, 32 detectors. The laser beam emitted from the semiconductor laser 11 may be collected and focused to project, a beam sufficiently wide to encompass or flood illuminate the downrange target and be reflected into a linear detector array, or for a single pixel, focused to a small spot and aligned to intersect with the detector field of view (FOV). A portion of the laser beam is reflected from the target 13, and collected by the receivers/detectors 14, 15. The detectors 14 and 15 may be a pair of detectors such as metal-semiconductor-metal Schottky photodiode (MSM-PD) OEM detectors. As shown schematically, when the transmitter modulation waveform (LO voltage) is applied to the detectors, a photocurrent response is recovered at each detector that is the product or mixing of the LO and the modulated light waveforms.

As mentioned previously, the present invention may be utilized in connection with small UAVs or the like. An example of a small sized ladar system is described in Stann, et al., "MEMS-scanned Ladar Sensor for Small Ground Robots," Proc. Of SPIE Vol. 76841E-1 (2010), wherein a ladar was mounted on an iRobot PackBot. FIG. 9 is a schematic illustration of a ladar system 30 comprising a laser 11S. The laser beam illuminates a MEMS mirror which is controlled by an HV Amplifier 32. The ladar utilizes a pulsed laser as a means to determine range to a pixel and a two-axis MEMS mirror to establish the angular direction to a pixel. Referring to the block diagram of FIG. 11, a trigger signal commands an Erbium fiber laser 11S to emit a short 2-3 ns pulse of light at a rate of 200 kHz that is collimated and then directed to the surface of a small MEMS mirror 31. Analog voltages from a high voltage amplifier 32 set the pointing direction of the mirror. Light reflected from the mirror is then fed into a telescope that "amplifies" the scan angle of the MEMS mirror 31. Light backscattered from the target is collected by a detector (described above). Photocurrent from the detector is fed into a monolithic 50 ohm microwave amplifier 41 whose output is then split into low and high gain channels and fed into the rf interface board 34. Here the low and high gain channels may be adjusted in gain and hard limited to protect the analog-to-digital convertors (ADC) 35. The ADCs 35 may sample at a 1.5 giga-samples-per-second (GSPS) rate. A first-in first-out register (FIFO) on a field programmable gate array (FPGA) 36 is commanded by the FPGA software to start acquiring ADC data upon transmission of the laser pulse. The FPGA 36 stores the amplitude data as a function of time from the ADC 35, determines the range to the pixel, and formats the data for acquisition by a PC for display. The FPGA 36 also controls the pointing direction of the MEMS mirror and directs the laser to emit a pulse.

An example of a LADAR measurement setup is discussed more extensively in the reference of W. Ruff, K. Aliberti, J. Dammann, M. Giza, P. Shen, B. Stann, entitled "Performance of an FM/cw prototype ladar using a 32-element linear self-mixing detector array", Proc. SPIE, vol. 5086, pp 58-69, 2003, hereby incorporated by reference. Analog to digital (A/D) converters may be used to sample the voltage from each detector and transfer the voltage data into computer memory.

Figure 12:
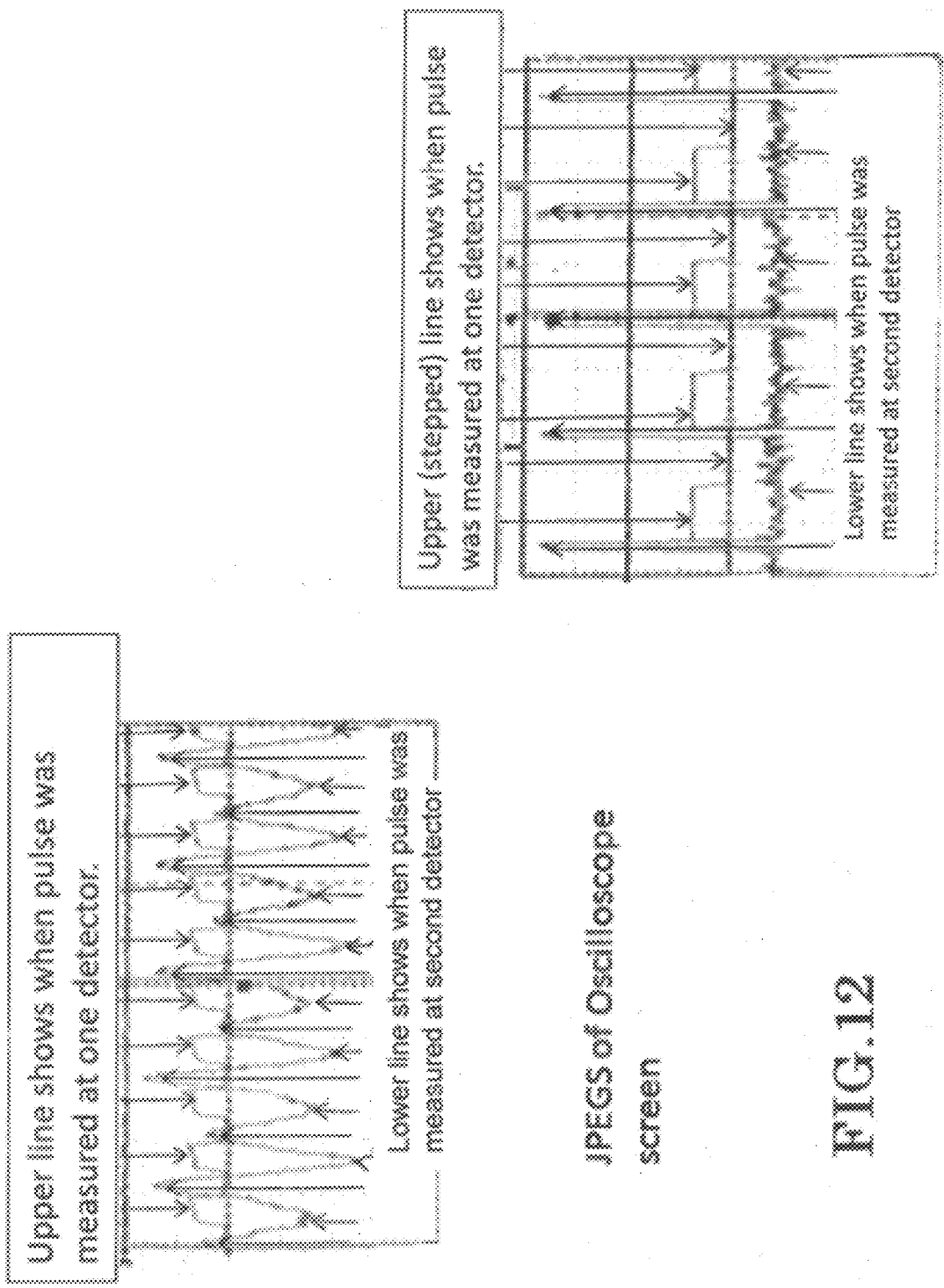
FIG. 12 shows some tests of time (distance) resolution on an optical table using a pulsed laser, 2 photo-detectors, and a smart oscilloscope.

FIG. 12 shows some tests of time (distance) resolution on an optical table using a pulsed laser, 2 photo-detectors, and a smart oscilloscope.

Since photon intensity variation is used in thermal ghost imaging, one risk factor is in replacing the Gaussian light source used in the interaction with the ground glass that produces the thermal light inhomogeneities, such as element 17T in FIG. 6. The light source used may be a nearly diffraction free source rather than a Gaussian light source. The approach was to find diffraction free patterns that will propagate down beam with the self mending property. The problem is mitigated in several ways. One technique is to bundle a number of fibers in parallel that each launch self-mending solutions of tight that substitute for speckles. Another technique is to use a fiber positioner on the diffraction free light source fiber and have it undergo a high speed random displacement and launch the light solitons in random transverse positions. Our solution to producing the variation of the signal source was to randomly displace the center of the Bessel beam projected through a spatial light modulator (SLM). A Bessel beam is nearly diffraction free and has a self-mending property upon interaction with particulate disturbances. FIG. 8 is a schematic layout of the Bessel beam illumination ghost imaging experiments. Quantum Ghost Imaging (QCI) may use a plurality of sensors. The first sensor (CCD 19) is a camera that looks at the reference beam of the light source. Second sensors (14, 15) may be single-pixel photon bucket detector that collects photons from a separate test beam path that are scattered and reflected from the object to be imaged. The quantum ghost image is constructed from the Glauber G(2) coherence using the coincidence measurements of photons. QGI is quantum, since it can use entangled photons or thermal photons that have a nonlocal, nonfactorizable property. The term QIGI may be used since only a photon bucket detector is used. The G(2) is computed using projected patterns of light for the reference beam and not the measured patterns of light. As the illuminating Bessel beam pattern (insert A in FIG. 8) is transmitted, each illumination pattern of the SLM was saved in computer memory so the QIGI could be computationally reconstructed using the additional photon bucket detector values. Detectors 14, 15 may comprise a single-pixel distant photon bucket detector as the only sensors. A diffraction free laser light source may be used in place of the usual transverse Gaussian or spatially random intensity beam. Diffraction free light beams penetrate through obscuring media far better than Gaussian beams. The diffraction free light beams have a self mending property in that when they encounter a small absorber their shape is temporarily distorted, but as they pass around the absorber they re-form into a self-similar shape. There is some loss of energy, but the concentrated light beam shape is maintained. This is a near ideal property for putting energy on target in the presence of the small and large particulates that occur in military smokes and fog. The diffraction free source can be fabricated from axicon lenses, special fiber optics, diffraction gratings, or an SLM (17T, 17A, 17R) and a laser 11.

Figure 13:
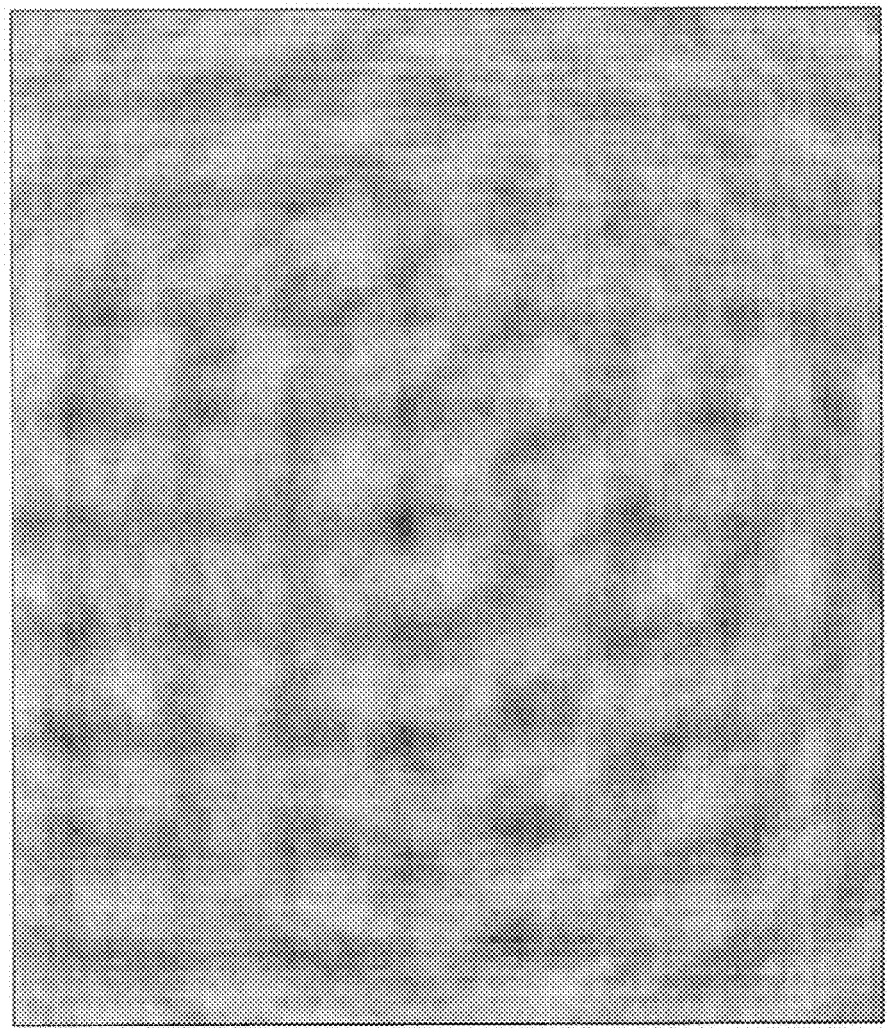
FIG. 13 illustrates the sum of all bessel illumination patterns used cropped to area of interest.

The schematic layout for the basic experiments using Bessel beams is shown in FIG. 8. A laser beam was expanded and transmitted through an SLM 17A to impress on the laser beam profile the phase for a Bessel beam. Single-pixel photon bucket detectors 14, 15 were used to collect photons scattered and reflected from the object. This beam was then propagated to a target, in this case, the letters "ARL" as represented by target 13 in FIG. 8. For example, the ARL may be a 10-point font size. To achieve reasonable illumination coverage over the ensemble of measurements of the target area, the Bessel beam patterns were randomly translated in x and y on the SLM. The sum, or equivalently the average, of all the Bessel beams used for illumination were computed and are displayed in FIG. 13. The patterns were not quite uniform; rather they exhibited some structured variation, although most of the space was filled.

Figure 14:
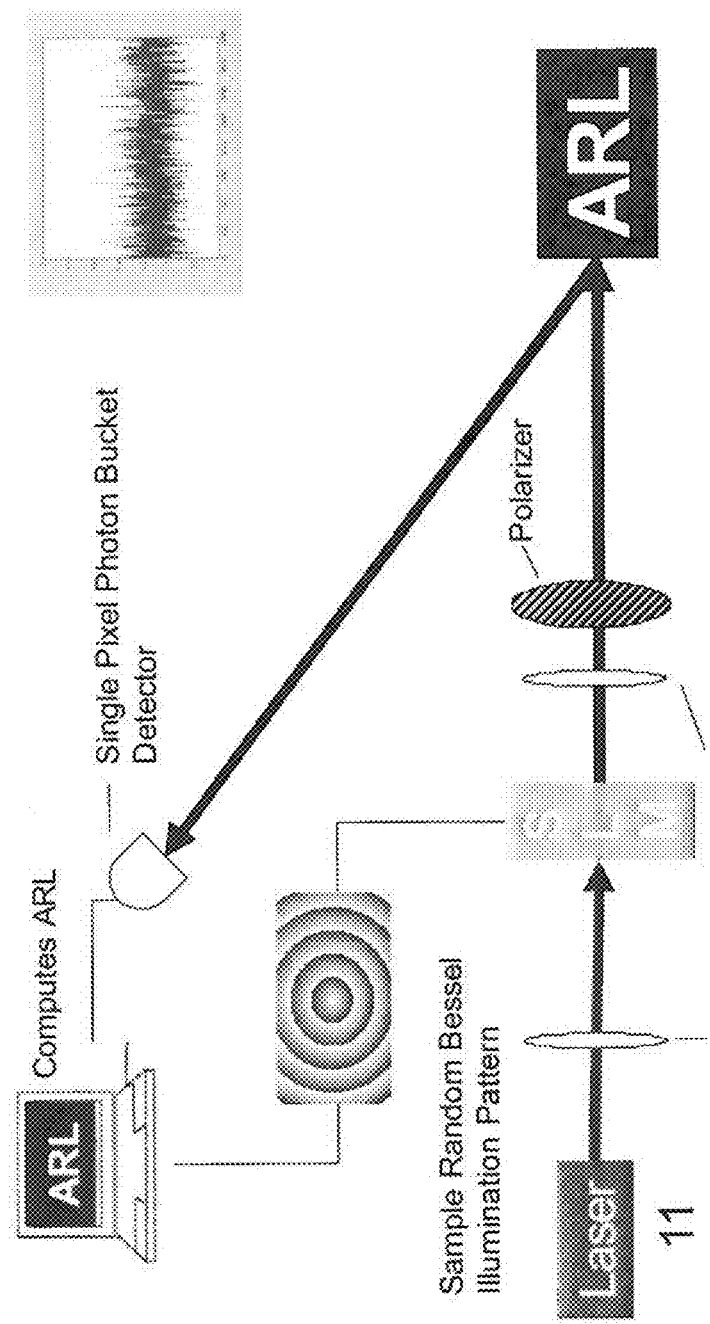
FIG. 14 is an illustrative image of a coarse Bessel pattern illuminating the ARL target.
Figure 15:
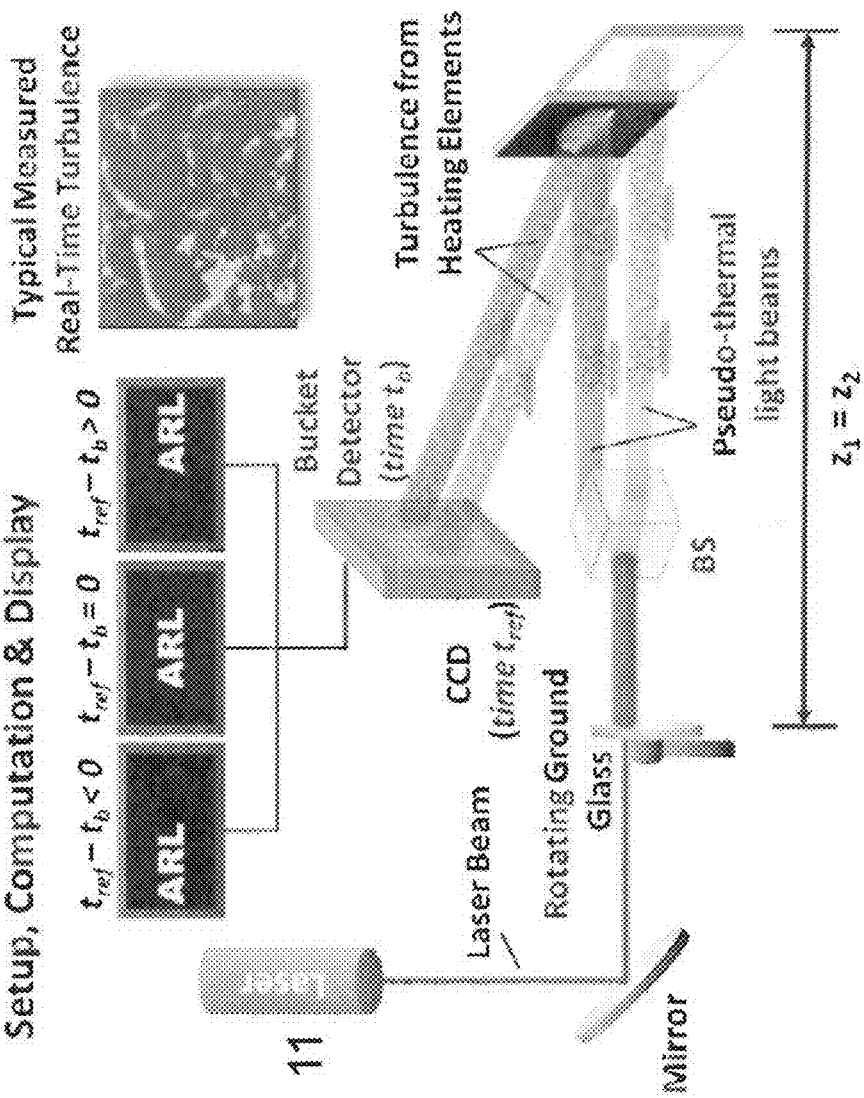
FIG. 15 illustrates a "space-time" Ghost-imaging set-up, computation and display.

Bessel patterns were randomly translated in x and y across the field of view by modulating the SLM for different illumination patterns on the target (FIGS. 14 and 12). FIG. 14 is an illustrative image of the coarse Bessel pattern illuminating the ARL target. FIG. 12 is an illustration showing sample randomly translated, coarse Bessel illumination patterns. Single-pixel, photon-counting bucket detector collected and measured the light reflected from the "ARL" target (FIG. 4 of the '428 Patent). These "bucket" measurements were then combined with the known Bessel illumination patterns to generate an image of the object (see FIG. 31 of the '428 Patent). Fine-scale illumination patterns can be resolved with high resolution fine images. Coarse Bessel patterns were used in an attempt to see if they could resolve fine lettering, where the distance between maxima in the illuminating beam was greater than the size of the letter dimensions. This first set of experiments was performed without obscuration to align and test the optics and SLM properties. Test images (FIG. 31 of the '428 Patent) revealed that coarse Bessel beams could resolve the fine letters.

Obscured Experiments

The configuration shown in FIG. 14 was tested in which the light beam 12 was passed through an offset pinhole (less than 2 mm in diameter) placed between an "ARL" target and the Bessel beam source. The target "ARL" was not in the direct line of sight from the laser to pin hole. The experiments were performed again using the randomly translated Bessel patterns. As was anticipated from the self-mending property of the Bessel beams, generation of a ghost image under such an adverse condition that was only slightly degraded from the unobscured ghost image.

Quantum Inspired Ghost Imaging

The SLM was used to project random illumination patterns onto a model soldier to generate ghost images of a three-dimensional (3-D) opaque object. Varying numbers of "on" illuminating pixels of the SLM were used in these experiments. The term "on" pixels means "macro-pixel illuminators" or "macro pixels." The positions of the "on" macro pixels were randomly distributed in space from measurement to measurement. QIGI results using a 1 macro pixel illuminator are presented in FIG. 35 of the '428 Patent and similar results using 3 macro pixel illuminators are presented in FIG. 36 of the '428 Patent. Computed opaque 3-D toy soldier image using 1 random single macro-pixel illuminator patterns and bucket measurements using 4000 illuminations patterns: (left) compressive imaging computation and (right) $G^{(2)}$ the inspired computation. FIG. 36 of the '428 Patent is a computed opaque 3-D toy soldier image using 3 random single macro-pixel illuminator patterns and bucket measurements using 4000 illuminations patterns: (left) compressive imaging computation and (right) $G^{(2)}$ the inspired computation. It should be noted that increasing the number of "on" pixels from 1 to 3 per measurement appeared to decrease the contrast of the generated ghost images, though the resolution may be greater.

FIG. 16A illustrates a Ghost Image computed using a 0 frame time shift under non turbulent conditions.

FIG. 16B illustrates a Ghost Image computed using −10 frame time shift under non turbulent conditions.

FIG. 16C illustrates a Ghost Image computed using +10 frame time shift under nonturbulent conditions.

FIG. 17A illustrates a Ghost Image computed using −15 frame time shift under non turbulent conditions.

FIG. 17B illustrates a Ghost Image computed using +15 frame time shift under non turbulent conditions.

FIG. 18A illustrates a Ghost Image computed using −20 frame time shift under non turbulent conditions.

FIG. 18B illustrates a Ghost Image computed using +20 frame time shift under non turbulent conditions.

FIG. 19A illustrates a Ghost Image computed using 0 frame time shift under turbulent conditions.

FIG. 19B illustrates a Ghost Image computed using −5 frame time shift under turbulent conditions.

FIG. 19C illustrates a Ghost Image computed using +5 frame time shift under turbulent conditions.

FIG. 20A illustrates a Ghost Image computed using −10 frame time shift under turbulent conditions.

FIG. 20B illustrates a Ghost Image computed using +10 frame time shift under turbulent conditions.

FIG. 21A illustrates a Ghost Image computed using −15 frame time shift under turbulent conditions.

FIG. 21B illustrates a Ghost Image computed using +15 frame time shift under turbulent conditions.

Note that the apparent motion of "ARL" displayed in the FIGS. 16-21 is a result of the ghost-image calculations made between reference and bucket measurements made at the indicated frame offsets.

Figure 22:
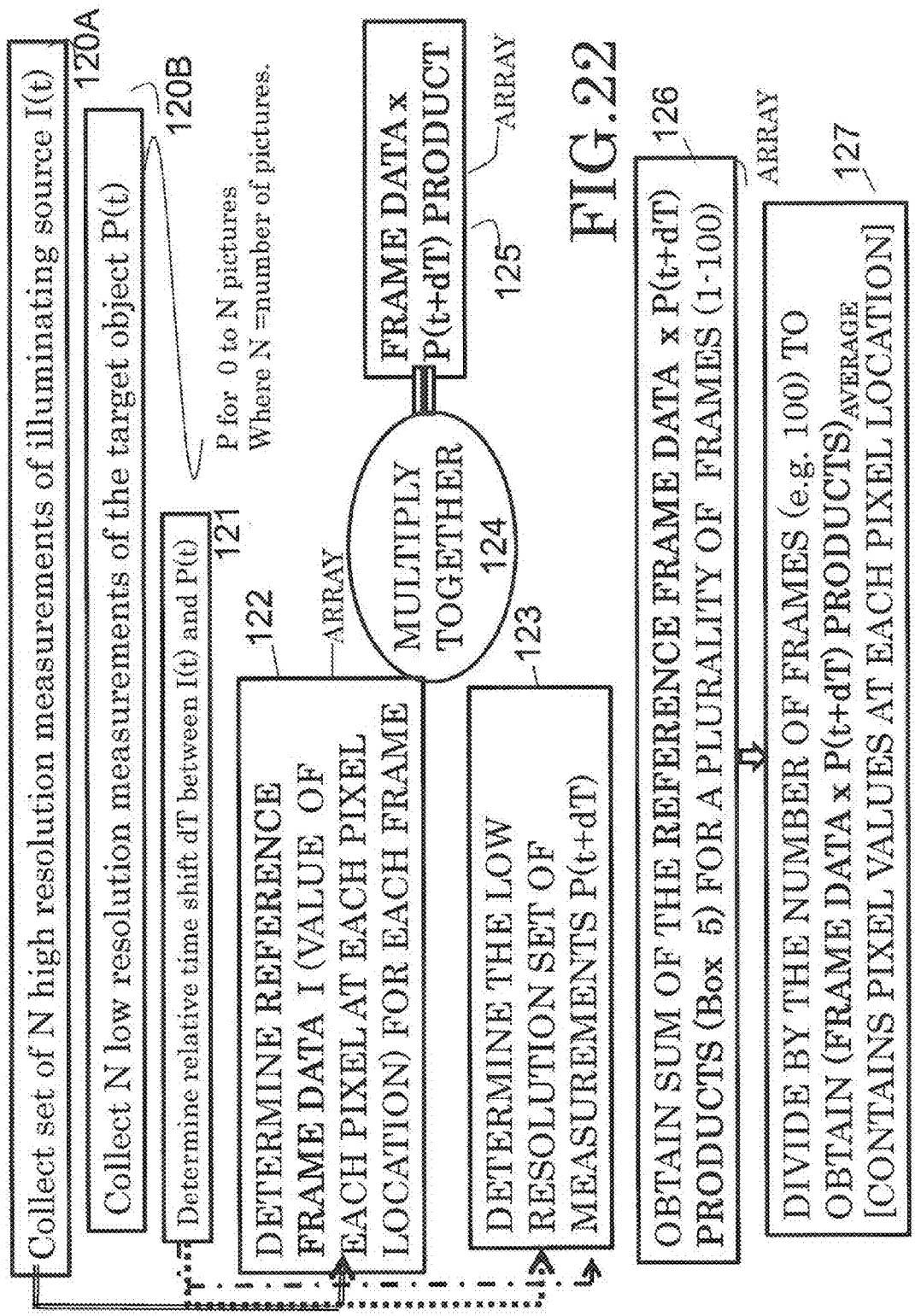
FIG. 22 is a partial schematic block diagram illustration of the steps for performing a preferred method of the present invention.

Referring now to FIG. 22, in accordance with a preferred methodology, in Box 1 a series or collection of high resolution measurements (or frames) of the illuminating light source (which may be, for example, the sun) are inputted into the memory or input of a processor or image processor. As used herein the terminology "processor" or "image processor" as used in the following claims includes a computer, multiprocessor, CPU, minicomputer, microprocessor or any machine similar to a computer or processor which is capable of processing algorithms.

In Box 120A, the frame data or value of each pixel at each pixel location is determined for each frame. In Box 120B, the pixel values in the low resolution set of measurements $P_t$ is determined. The low resolution frames may comprise photographs of the same region of interest. The region of interest may be a scene, landscape, an object, a subject, person, or thing. Where the low resolution source is a low resolution camera, the value of a pixel correlates to a "bucket value" determination and correlates to the light intensity measured by the detector. In the case of an electronic display formed by pixels, the intensity of each pixel value at each pixel location P is determined. At Box 124, the values in Box 122 are multiplied by the values determined in Box 123. Box 125 represents the Frame Data x $P_{t+dT}$ Product. Inasmuch as the Boxes 122 and 123 are arrays of pixel values, the Box 125 Product is also an array of values. At Box 126, the products of Box 125 are repeatedly calculated for each frame in a selected plurality of frames and summed together. As an example, one hundred frames may be selected. At Box 127, the summation Box 126 (Products for the determined in Box 126) is divided by the number of frames (such as for example one hundred) to determine the Frame Data x $P_{t+dT}$ Products Average for the plurality of frames. The Product Average in Box 127 is an array containing pixel values at each pixel location within the frame.

Figure 23:
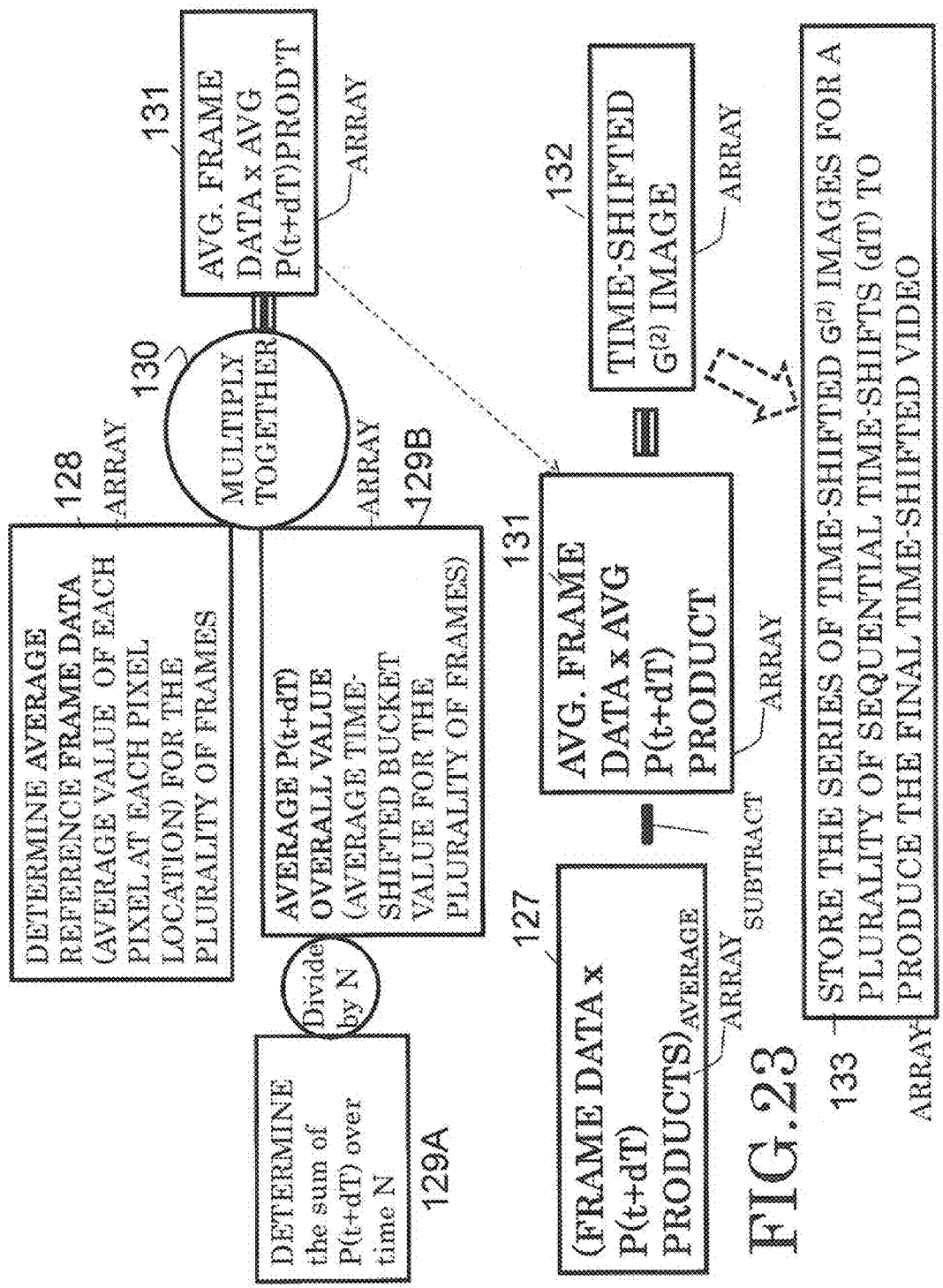
FIG. 23 is a partial schematic block diagram illustration of the steps for performing a preferred method of the present invention. Taken together, FIGS. 21, 22, and 23 outline the steps of a preferred methodology for the present invention.

FIG. 23 is a continuation of FIG. 22 and is a further description of as preferred methodology of the present invention. Note that Box 127 is carried over from FIG. 22 into FIG. 23. In Box 128, the average frame data (or average value of each pixel at each pixel location) is determined for the plurality of frames (e.g. 100) by averaging the pixel values at each pixel location for the plurality of frames to determine an array of average pixel values. In Box 129A the sum of $P_{t+dT}$ over time N for each pixel is determined. $P_{t+dT}$ represents the pixel location within each frame of the low resolution images (or bucket detector values). Prior to Box 129B, the result of Box 129A is divided by N. In Box 129B, the average $P_{t+dT}$ for the plurality of low resolution frames is determined. This correlates to the average of the light intensity of each pixel at each pixel location $P_{t+dT}$ in the set of frames N. In the case of a picture, the correlates to the reflected illumination at each pixel location $P_{t+dT}$. In the case of an electronic display formed by pixels, the average pixel intensity or pixel value at each pixel location is determined.

Box 130 represents the multiplication of Boxes 128 and 129B to form the Average Frame Data x Average $P_{t+dT}$ Product (Box 131), which is an array. As shown in the bottom portion of FIG. 23, the Average Frame Data x Average $P_{t+dT}$ Product is subtracted from the Frame Data x $P_{t+dT}$ Products Average to form the intermediate $G^{(2)}$ Image of Box 132. In Box 133 the sum of the intermediate $G^{(2)}$ Images for the frames 1-N is calculated to produce the final composite image.

Figure 24:
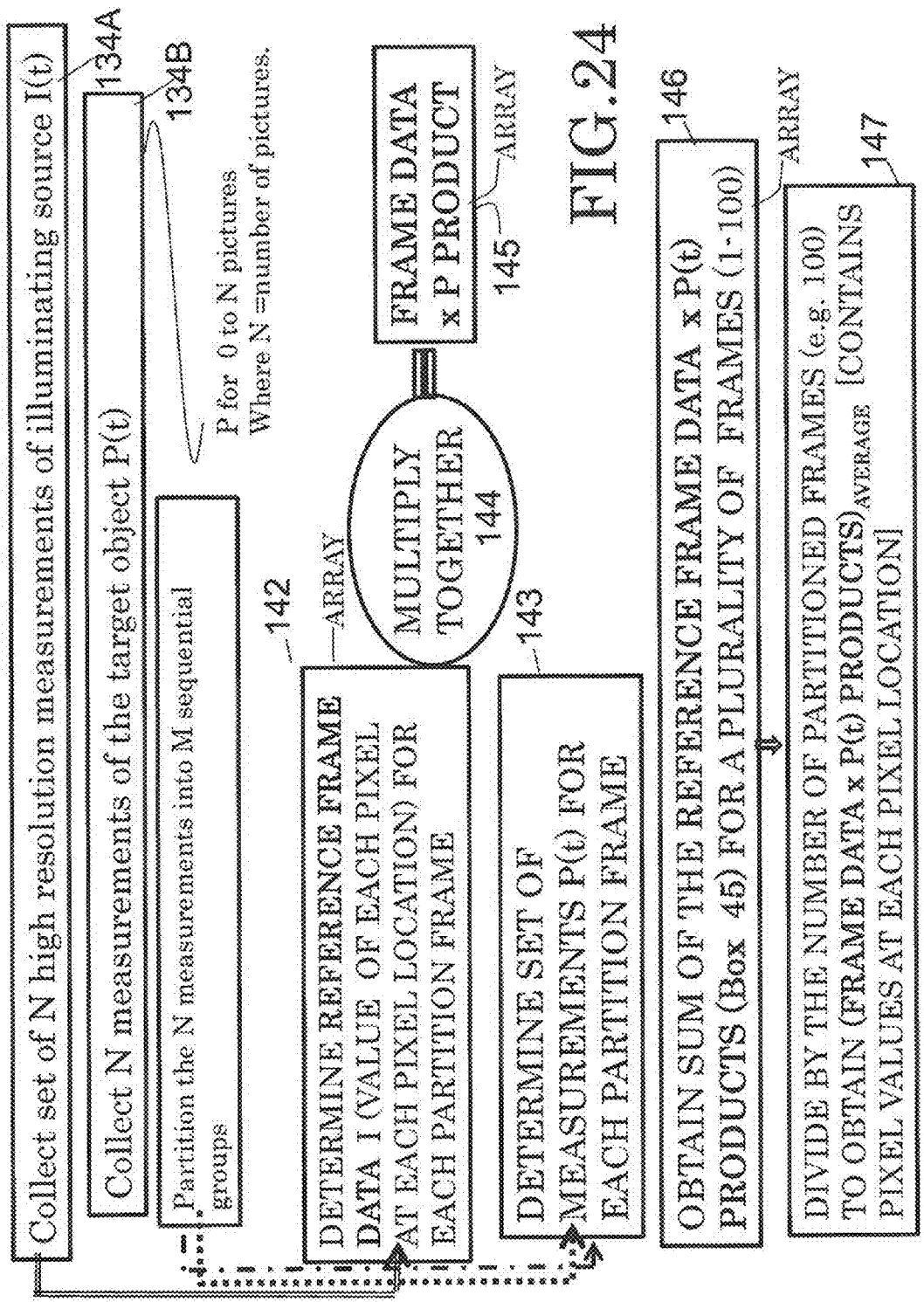
FIG. 24 is schematic system block diagram of steps for a preferred embodiment according to the principles of the present invention.

A preferred embodiment of FIGS. 22-24 comprises multiple photo-sensor buckets scanned or in an array and high resolution images of the illuminating light source. Depending on the object and the light source that it is scattering and reflecting it is possible that light is scattering or reflecting from any location on the subject such that any or all of the photo-sensors in the array has as probability of measuring one or more photons of light. A low resolution camera can be used as the multiple photo-sensor bucket array. This invention demonstrates that a higher resolution $G^{(2)}$ image of the target can be produced using high-resolution images of the illumination source coupled with information from the multiple photo-sensor bucket array. Use of the multiple photo-sensor bucket array can improve the convergence rate of the high resolution $G^{(2)}$ image. Each photo-sensor in the multiple photo-sensor bucket array may measure light scattered and reflected from distinct portions of the target object with appropriate optics that images the subject onto the multiple photo-sensor bucket array.

A concept of FIGS. 22-24 is that if the nonspatial information resolving single-pixel "bucket" detector that measures light from the target object that is typically used for $G^{(2)}$ imaging was replaced with a low resolution spatial information resolving device such as a Charge Coupled Device (CCD) camera and the detector that measures the light from the source of illumination is a high resolution spatial information resolving, device, i.e., a high resolution CCD, then one could use the techniques of $G^{(2)}$ imaging to generate an image that would be at the resolution and quality of the high-resolution device using the extra information measured by the low-resolution target object detector. This may be accomplished by treating each nonspatial information resolving pixel of the low-resolution detector as a separate "bucket" measurement to create a $G^{(2)}$ image. The generation of $G^{(2)}$ images is performed over the entire set of pixels of the low resolution camera and each low-resolution $G^{(2)}$ image is accumulated into a composite $G^{(2)}$ image that provides the final result. It should be noted that prior to generating a low-resolution pixel $G^{(2)}$ image, the low-resolution pixel value can be tested to determine by some metric if a $G^{(2)}$ image should be computed using that low-resolution pixel, i.e., an option includes not computing a 6 image if all the values at that low resolution pixel are 0 or below some threshold value.

Another FIGS. 22-24 preferred embodiment uses a single bucket detector to scan over different areas of a target. At each step of the scan a $G^{(2)}$ image would be computed and accumulated into a composite $G^{(2)}$ image for all positions that the detector scanned.

Figure 25:
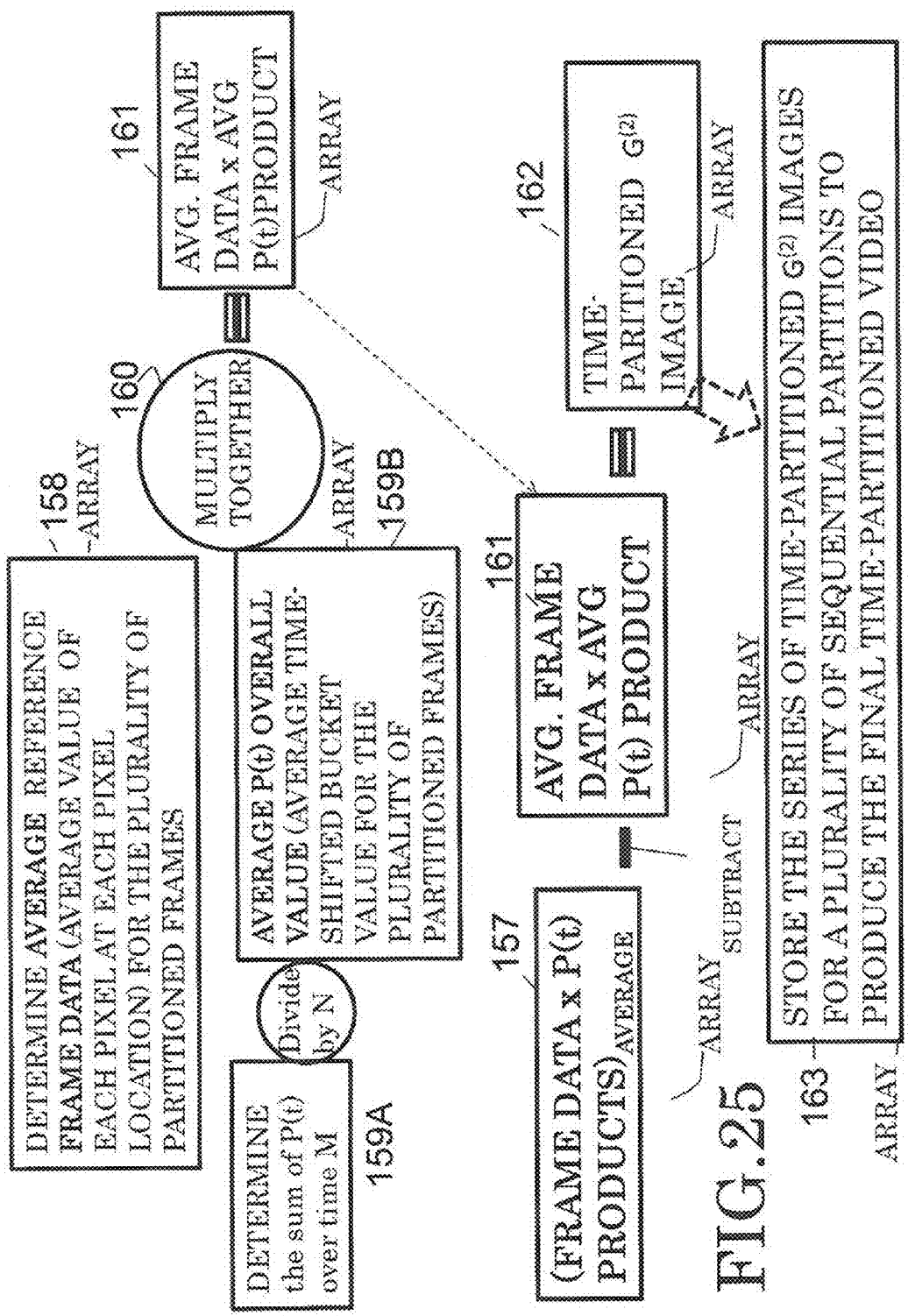
FIG. 25 is a schematic block diagram of steps for alternate preferred embodiment according to the principles of the present invention.

FIG. 25 is an alternate description of a preferred methodology of the present invention. In Box 161, the average frame data (or average value of each pixel at each pixel location) times the average $P_{(t)}$ is determined. In Box 159A the sum of $P_{(t)}$ over time M is determined. Prior to Box 159B, the result of Box 159A is divided by N. Box 161 represents the average frame data times the average $P_{(t)}$ product. Box 161, which represents the average frame data times the average $P_{(t)}$ product, is multiplied by Box 157, which represents the frame data times $P_{(t)}$ products average. As shown in the bottom portion of FIG. 25, the Average Frame Data x Average $P_{(t)}$ Product is subtracted from the Frame Data x $P_{(t)}$ Products Average to form the time partitioned $G^{(2)}$ Image of Box 162. Box 163 represents the series of the $G^{(2)}$ Images for a plurality of sequential partitions to produce the final time-partitioned video.

Figure 27:
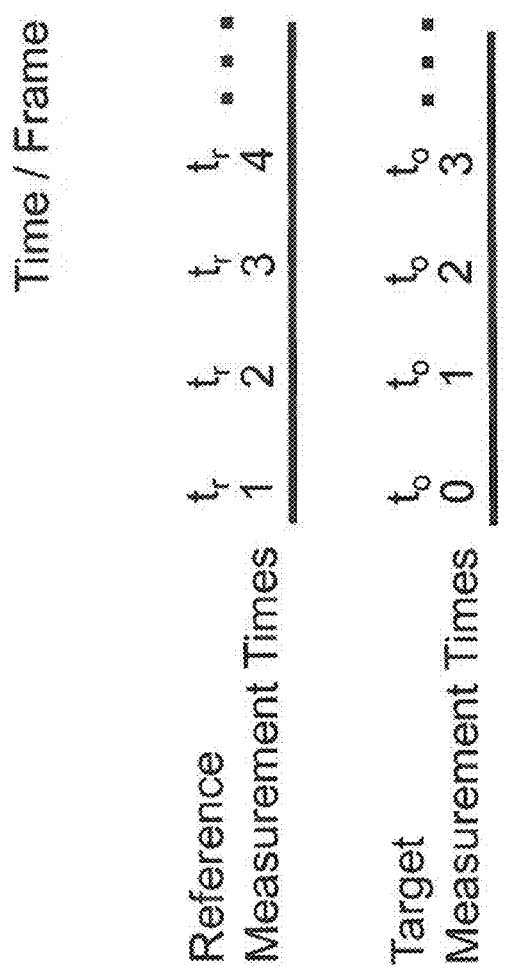
FIG. 27 is an Illustration of the time/frame measurements between the Reference and Target measurements with a predetermined time offset or frame offset.
Figure 28:
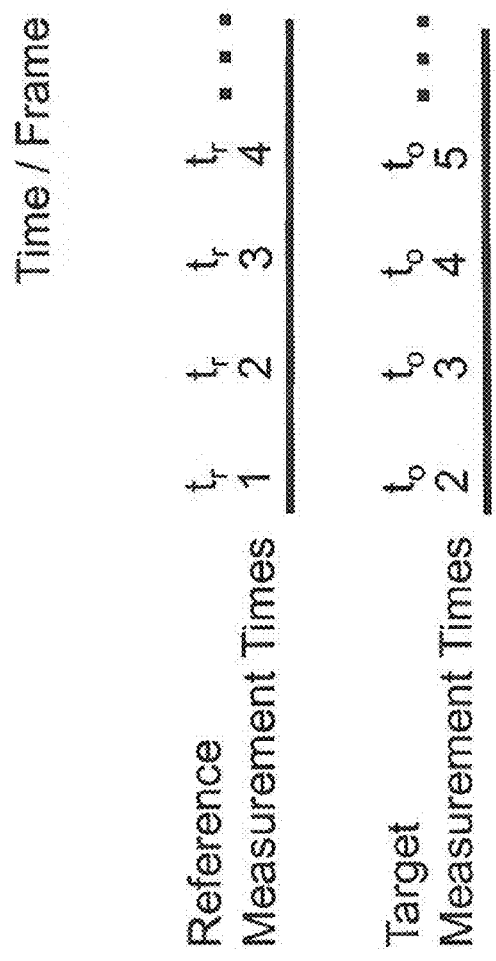
FIG. 28 is an Illustration of the time/frame measurements between the Reference and Target measurements with a second predetermined time offset or frame offset.

FIGS. 26, 27, and 28 are Illustration of the time/frame measurements between the Reference and Target measurements with a 0 time offset or frame offset (FIG. 26) and with two different offsets (FIGS. 27 and 28).

Figure 29:
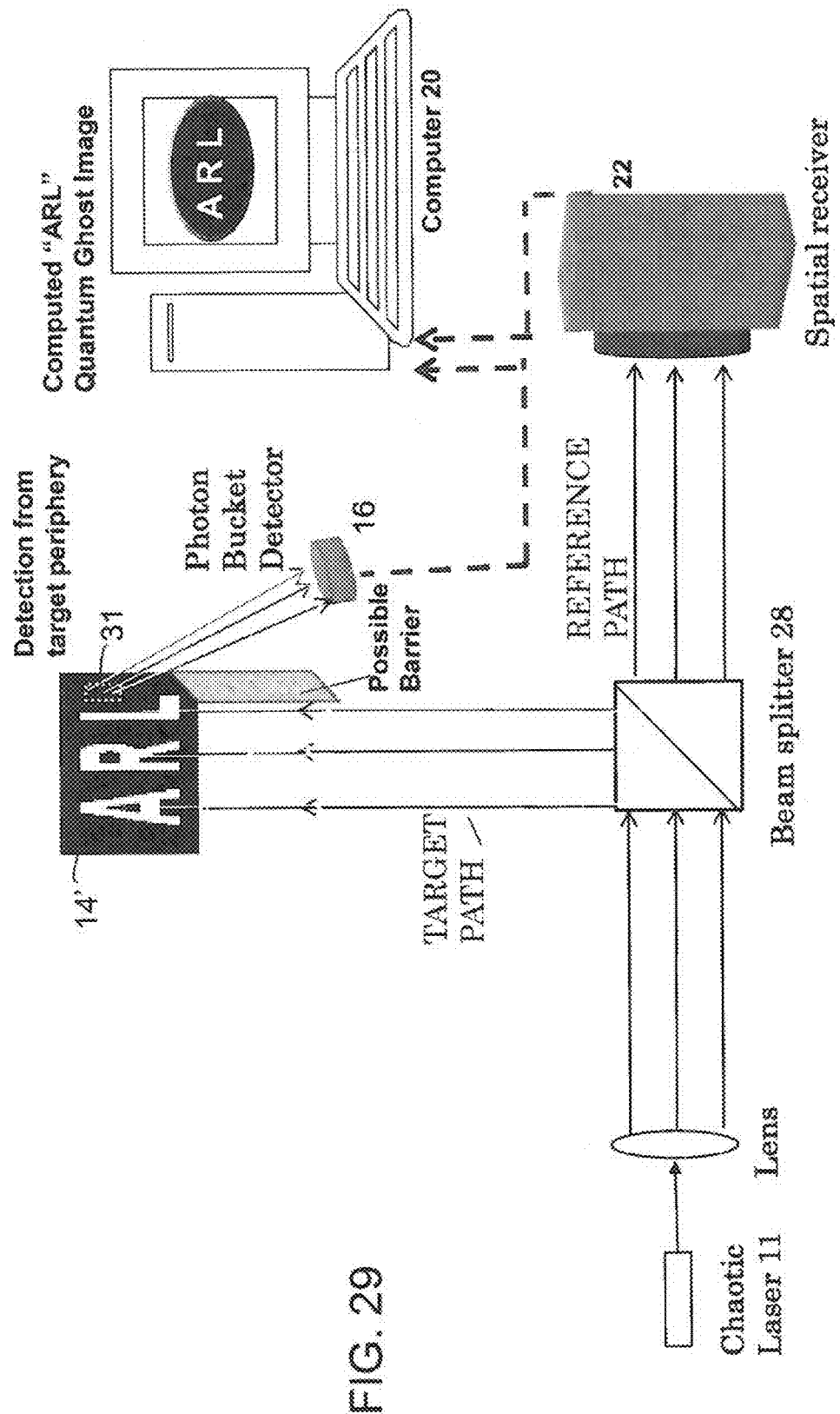
FIG. 29 is schematic depiction of an alternate preferred embodiment showing an experimental set-up for quantum imaging "absent-line-of-sight."

Referring now to FIG. 29, a preferred embodiment of the present invention may utilize a light source emitting radiation that is one of an entangled, thermal, or chaotic light source. The photons from the light source may be divided into two paths: one path for the object to be imaged, and the other path in which images of the entangled, thermal, or chaotic light are measured independent of interaction with the objects. Any or all paths may pass through an obscuring medium. The measurements of the entangled, thermal, or chaotic light may then stored for future processing. In U.S. Pat. No. 7,812,303, the light in the object path is collected into as bucket detector and measured. The measurements of the bucket detector are then stored for future processing. A process for solving for the $G^{(2)}$ Glauber coherence between the two paths is provided to reconstruct the image. The $G^{(2)}$ Glauber coherence between the two paths is used to generate a correlation two-photon ghost image.

Non-Line-Of-Sight-Ghost-Imaging

FIG. 29 is schematic depiction of an experimental set-up for quantum imaging "absent-line-of-sight," including photon probability paths from the illuminated target. During this experiment, only the photons that were measured in the white outlined area 31 were used. The white outlined, area contained no spatial patterns about the "ARL" target because only photon counts were measured by a non-resolving single pixel bucket detector 16. The ARL was not in the line-of-sight of the bucket detector 16. The photon counts inside the white outlined area 31 were used as the "bucket" measurements. Computing the $G^{(2)}$ correlations using the bucket measurements and the coincidently measured reference frames produced the Ghost image of ARL in FIG. 31. This experiment was conducted under conditions of extreme turbulence in all of the paths for both the reference and the target (as shown in FIG. 29). However, the technique can be utilized with or without turbulence. Compressive Imaging (CI) methods were used to compute the $G^{(2)}$ ghost image; however, similar images could be produced using direct Glauber $G^{(2)}$ computations. As explained in detail above, the $G^{(2)}$ image of the object is obtained by correlation to photon ghost imaging from signals produced by bucket detector 16 and imager 22. The imager 22 may be a CCD, digital camera, video camera, scanner, or the like. Similarly, the detector 16 may comprise a bucket detector or CCD, digital camera, video camera, scanner, or the like which is configured to count photons (i.e., record energy imparted by photons). The two-photon correlation computation subsystem 18 comprises a voltage output recorder, coincidence circuit and CDCD output recorder. Subsystem 18 computes the two-photon correlation quantum ghost image utilizing the input values from elements 16 and 22.

In the preferred embodiment depicted schematically in FIG. 29, a "Ghost Image" an object is obtained that is not in the direct line of sight or field of view of the viewer, which may be for example, a bucket detector 16. When a bucket detector is aimed nearby the object at location 31, then a "Ghost Image" of part or the entirety of the object is generated, even in the presence of turbulence which might otherwise be disruptive to image generation. Scattering of quantum particles such as photons off the object, such as the location depicted in the oval 31, carries information of the object shape even when the quantum particles such as photons of light do not go directly to the bucket detector 16. The bucket detector 16 picks up quantum information on the object shape and its temporal relations to separate reference fields. The reference fields are recorded by an imager 22 (CCD, or camera, etc.) that looks at the light source 12 but not the object. The embodiment of FIG. 29 comprises the computer 18A. In the embodiment of FIG. 29, the target 14' appears on a piece of paper on which the letters ARL are printed. The paper was approximately 1.7 m from the detector 18.

Figure 11:
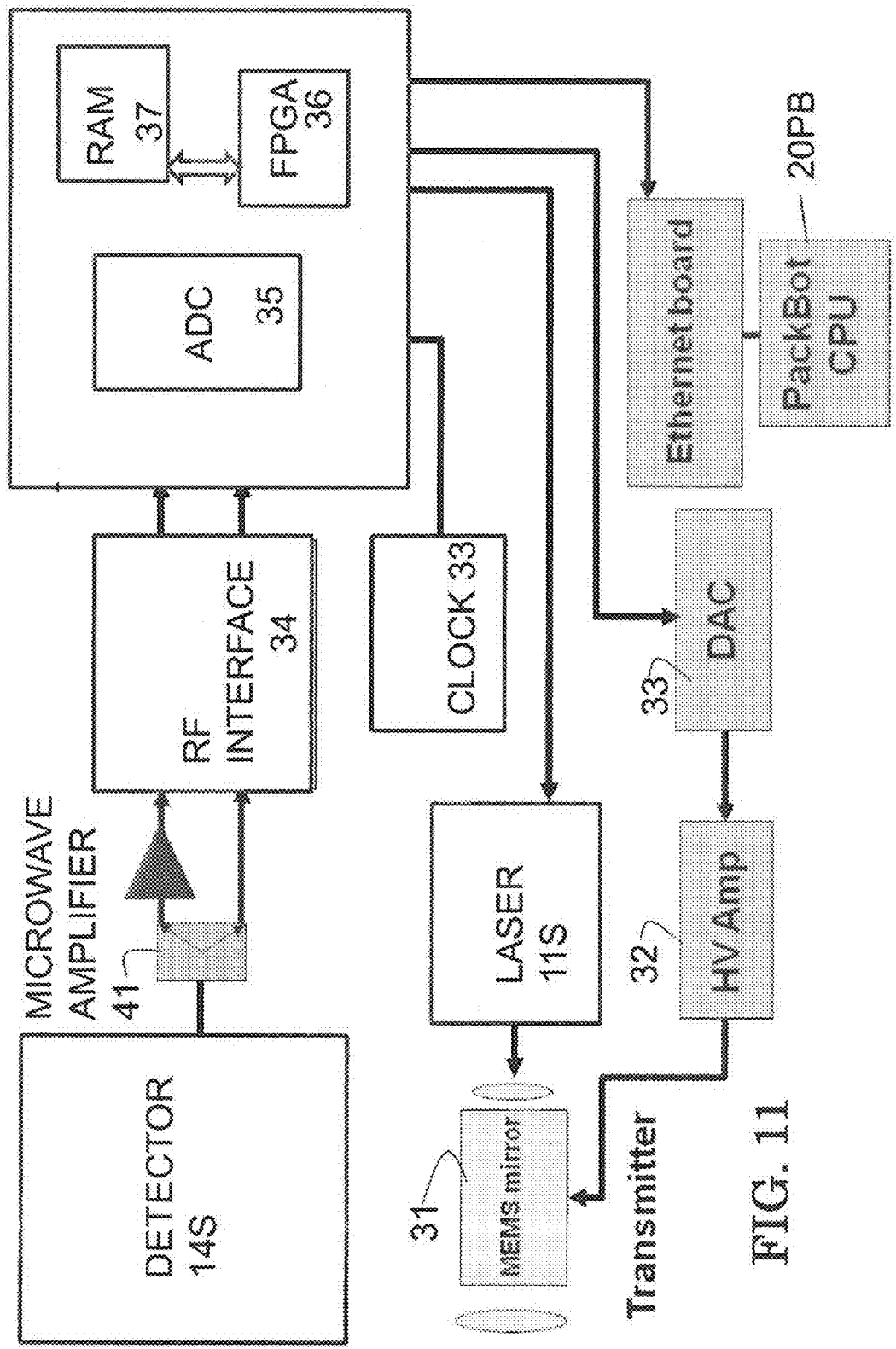
FIG. 11 is schematic system block diagram of showing ladar components.
Figure 30:
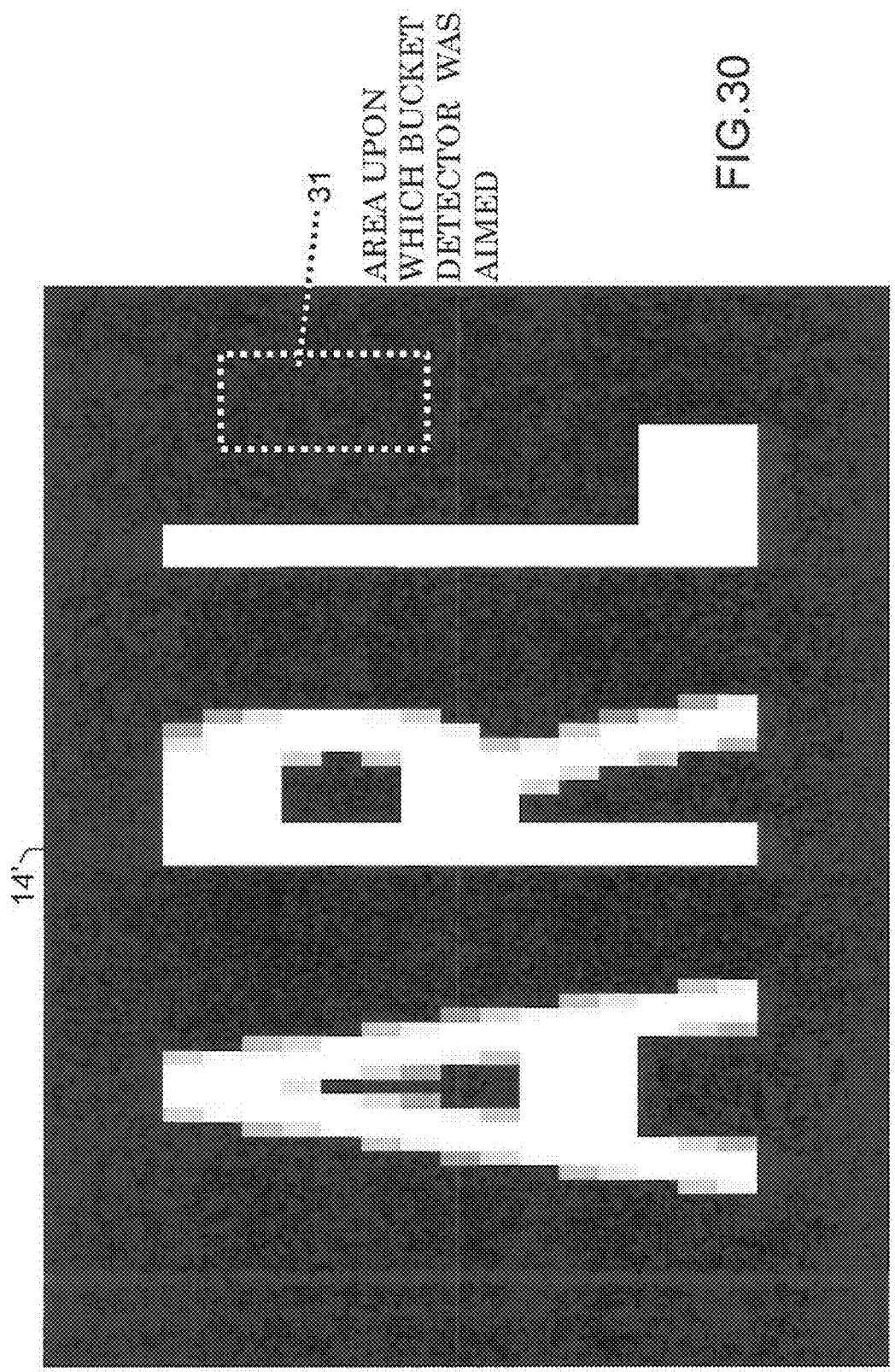
FIG. 30 is an illustration of an "ARL" target of FIG. 29 printed in white and illustrating the approximate location 31 where the bucket detector 16 was aimed.

FIG. 30 is a low resolution average image "ARL" bucket target area for 10,000 frames. The non-line-of-sight "bucketing" area 31 was located within the box outlined in white. All of the frames were imaged through high levels of turbulence. As depicted in FIG. 11, the invention was observed to work even when the bucket detector 16 was aimed at a region to the side of the ARL (shown as area 31 in FIG. 30) that was coplanar with the object, i.e., the ARL appeared on a piece of paper and the bucket detector was directed to the paper at the location labeled 31 in FIG. 30.

In connection with FIG. 30, the ARL target was produced using a 10 point bold Arial font colored white, with black background, actual printed size. The ARL target was printed in white using an Arial 10 point font bold capital letters. To obtain a perspective as to scale, given that a single font is 0.3527 mm, the height was approximately 3.527 mm. The measured distance from the beginning of the A to the end of the letter "L" is approximately 9 mm. The width of the rectangle 31 was approximately 1.25 mm and the height was approximately 1.75 mm. The rectangle 31 was approximately 2 mm from the upright portion of the "L."

The paper 14' in FIG. 30 is translucent with an approximate weight of 20 pounds per 500 basis ream with a brightness value of 92 on a TAPPI Brightness scale of 1 to 100. The paper in FIG. 30 was mounted on white cardboard backing. The paper 14' was semi-shiny to visible light laser illumination and had a thickness of 0.097 mm.

Figure 31:
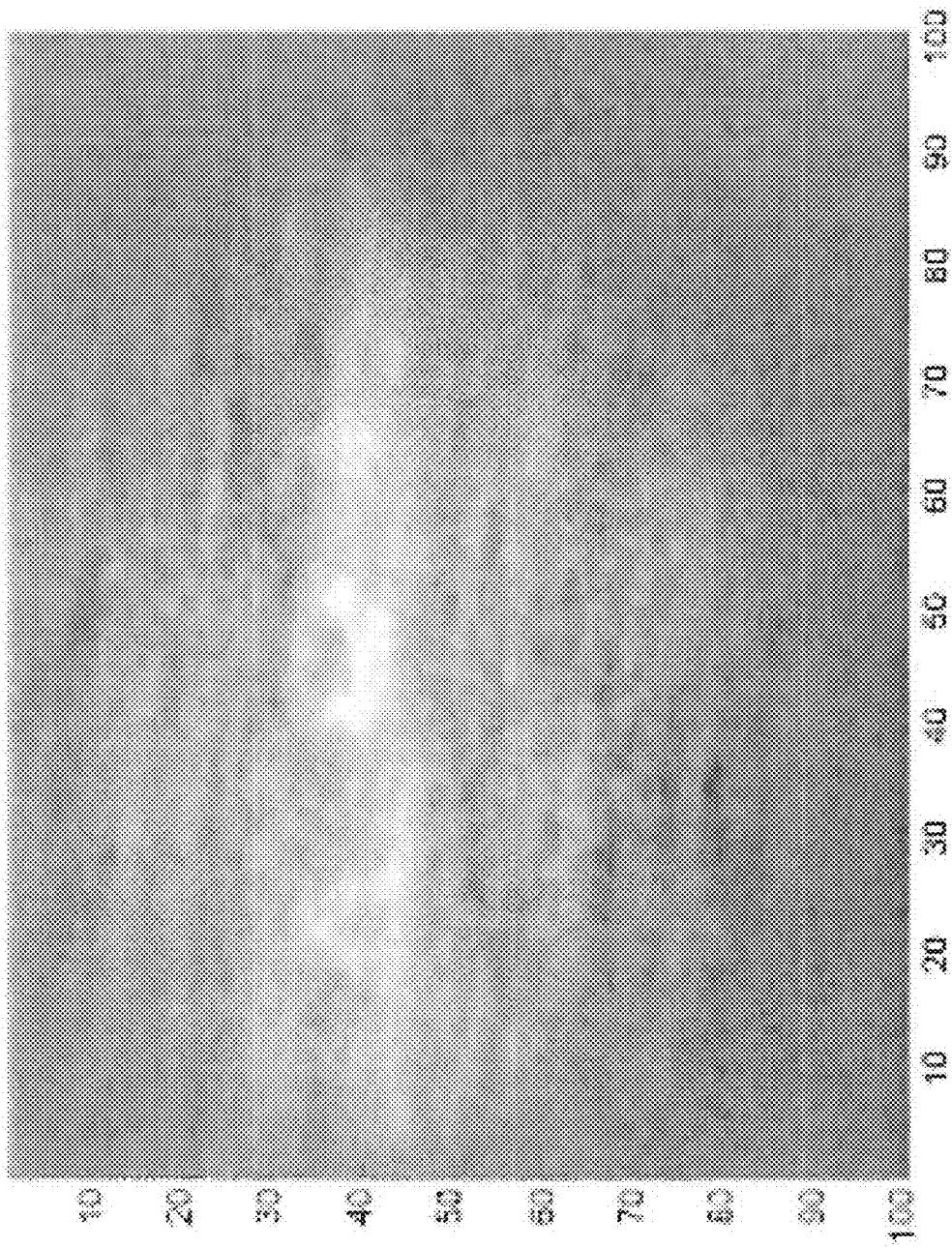
FIG. 31 is an illustration of a ghost image computed using only the per frame photon counts integrated insider of the white box 31 (shown in FIGS. 29 and 30) using 10,000 frames and the $G^{(2)}$ ghost image was computed using compressive imaging methods.

FIG. 31 is an illustration of a ghost image computed using only the per frame photon counts integrated insider of the white box 31 (shown in FIGS. 29 and 30) using 10,000 frames and the $G^{(2)}$ ghost image was computed using compressive imaging methods.

Translucent objects allow the light to enter the material, where it is scattered around in a manner that depends on the physical properties of the material like the absorption coefficient (a) and the scattering coefficient (s), as described further in "Acquisition of Subsurface Scattering Objects," a Diploma Thesis by Christian Fuchs, Max-Planck-Institut für Informatik, Saarbrücken, Germany (date appearing on thesis is Feb. 9, 2006). Accordingly light may enter the material for subsurface scattering, including single scattering as described further in "Acquisition of Subsurface Scattering Objects," hereby incorporated by reference. Moreover, concepts relating to a general bidirectional surface scattering distribution function (BSSRDF), relating to light transport, is described further in "A Practical Model for Subsurface Light Transport," hereby incorporated by reference.

In accordance with the principles of the present invention the image forming correlations between measurements at two different times exhibit a form of memory. The fact that images are preserved in the correlations between two different times indicates that the invention is a form of memory. This memory may be useful for general quantum or classical uses such as for quantum or classical computation, communications or other processes where memory is useful.

Note that with respect to all of the preceding embodiments, each detector can optionally time-stamp the measurements the receiver or detector makes. For example, the time-stamp may occur when the shutter is open and when the shutter is closed, another option would be to time-stamp when a photon is detected. A shutter can be electronic or mechanical. Each time-stamp can be referenced to the same system clock. In the embodiments where a time interval, delta, time delay, or time advance is specified, the measurements may take place within some delta-time window i.e. the time the shutter is open. This measurement correlates to a frame of data. In the embodiments where a time interval, delta, advance or delay is specified, the deltas, time delay, time interval or time advance may be referenced in the invention may be measured relative to the time-stamp differences between the detectors. Note that the apparent motion of "ARL" displayed in the figures is a result of the ghost-image calculations made between reference and bucket measurements made at the indicated frame offsets.

(1) A ghost image is typically computed using measurements made by a "bucket" detector that detects light from the target subject and "reference" detector that measures the light emitted by the light source at a set of specified times. These measurements are then used in a computational process, i.e. G(2), Correlation, Compressive Sensing (CS), to compute a ghost image. These data in these processes operate with the data from the reference, Reference(x,y,t1), and bucket, Bucket(t2), being at coincident times, i.e. t1=t2 where t1 and t2 are the times the respective measurements were made. However, it is possible to compute a ghost image when the measurements from the bucket and reference are shifted in time relative to each other. Thus a ghost image can be computed under the conditions of Reference(x,y,t+n1*dt) and Bucket(t+n2*dt) where the relative time between the Reference and Bucket is RT=(n1*dt−n2*dt) where n1 and n2 are labels for the position of a particular measurement in a sequence of measurements. Generally, a ghost image of an object can be computed when RT is within the "coherence time" of the system source. The "coherence time" of the system is determined by properties of the light source and influences of other scattering media in the optical paths. In the instance where the light source is a pseudo-thermal light source produced by a rotating ground glass the ghost images computed at each RT are shifted to the right or left of the ghost image computed at RT=1. If a sequence of ghost images are computed and indexed from RT=−M to RT=+M a movie of the object traversing the computational imaging area is produced.

(2) The movie/video produced using the process described in the previous paragraph (1) may be further processed by extracting a Line of pixels of the frames of the video. Each extracted Line is inserted into another array at a location indexed by RT for all of the frames in the video. The composite image thus produced may exhibit interference fringe patterns. These interference fringe patterns can then be used to extract more detailed surface height information of the target object.

Typically to produce a movie, where a movie is a series of image frames that can be replayed in a sequential order, using a ghost imaging methodology one would make a large set of N bucket measurements of an object. The N measurements for each frame need to take place over a time span for which there is minimal change in the field of view of the bucket detector. The next frame of the movie would make another set of N measurements at a time subsequent to the previous frame. The relative time RT within each frame can be set to a specified value to produce a movie.

It is noted that for each "frame" of the method in previous paragraph, a movie can be made using the method described in (1).

A. A ghost movie can be computed by portioning a set of M1, M2 measurements of the reference field and object into N groups. In the following we assume M=M1=M2. The differential size of each group dM is M/N. Each group is in sequential order such that group 1 would have measurements 1 to dM, group 2 would be dM+1 to 2*dM similarly to group N consisting of measurements (N−1)+dM to N*dM. Each group has a ghost image computed using the specified data in the group in the sequence 1 to N. The method for computing the ghost image is outlined in (1) above for a setting of RT=0. The ghost images are stored as a frame in a playable movie format.

B. Any movie created using the process described in A can also have a movie produced by setting RT to values other than 0.

C. Each group described in A may have a ghost movie computed using the process in (1) and in FIG. 2.

D. The computational means by which a ghost image is computed may consist of but is not limited to G(2) calculations, compressive sensing/imaging techniques, and direct correlation calculations.

As used in the specification and following claims, the term "processor" means one or more processing units, central processing unit(s), CPU, processor cores, microprocessors, digital signal processors, multiprocessor(s), computer(s), and/or controller(s) which may be connected together or to other circuitry in a manner known to those of ordinary skill in the art.

As used in the specification and claims, the term "subject" means stationary or moving target, object, entity, person or persons, landscape, scene, vehicle or vehicles and includes object(s), area, person(s), setting, place, scene or the like.

As used herein the terminology "spatial information" refers to two-dimensional or three-dimensional information. For example, spatial information can be represented in two distinctly different forms. Images, for example, may appear as raster data or a gridded matrix in which the position of each data point is indicated by its row and column numbers. Spatial information may include 3-D visualizations. Spatial analysis or spatial statistics includes any of the formal techniques which study entities using their topological, geometric, or geographic properties.

The terminology "nonspatial information" as used herein means information which is one dimensional (1-D) such as that recorded by a bucket detector.

Similarly, as used herein, the terminology "spatially integrated" detector or receiver relates to a receiver front which the integration or summation of the light illumination may be determined, such as a bucket detector, for example.

The terminology "bucket detector" means a detector which detects photons of light without imaging capability or two-dimensional information.

As used herein, the terminology spatial detector or receiver detects spatial (two-dimensional or three-dimensional) information.

The terminology "ghost imaging" or "quantum ghost imaging" (QGI) as used herein have the same meaning except when specifically indicated to the contrary. "Ghost imaging" or "quantum ghost imaging" includes imaging emerging from the correlation between the output of a bucket detector (or a plurality of bucket detectors) that collects light that interacted with an object with the output from a second, scanning point detector or a CCD array that is illuminated by the same source. The imaging system does not require that the bucket detector have imaging capability.

The terminology "computational ghost imaging" or "quantum ghost imaging" or "ghost imaging" as used herein have the same meaning except when specifically indicated to the contrary and relate to imaging emerging from the correlation between the output of a bucket detector (or detectors) and computational outputs which compute the spatial information concerning the light beam. The computational outputs determine the spatial information and replace the second detector. "Computational ghost imaging" or "quantum ghost imaging" or "ghost imaging" may use an incoherent sources of light.

The terminology "pseudothermal ghost imaging (PGI)" or "quantum ghost imaging" or "ghost imaging" as used herein have the same meaning except when specifically indicated to the contrary. "Pseudothermal ghost imaging (PGI)" or "quantum ghost imaging" or "ghost imaging" may use a single random source and, by correlating the output of at least one bucket detector with at least one spatial detector, obtain an image of an object.

The terminology "spatial light modulator ghost imaging" or "ghost imaging" or "quantum ghost imaging" (QGI) as used herein have the same meaning except when specifically indicated to the contrary, and comprises using a spatial light modulator to modulate the light transmitted to the target or subject area. The spatially modulated light may also be directed to a second CCD detector or the like to record the spatially modulated light.

The terminology "Gaussian state" as include laser light and, "classical states."

The terminology "incoherent light" as used herein means electromagnetic radiant energy not all of the same phase, with or without various wavelengths.

The terminology "thermal light" or "thermal radiation" as used herein means electromagnetic radiation emitted from a material which is due to the heat of the material, the characteristics of which depend on its temperature; for example infrared radiation emitted by a common radiator or electric heater.

The terminology "beam splitter" as used herein means an optical device that splits a beam of light in two. The terminology beam splitter includes a cube made from two triangular glass prisms which are glued together at their base using resin. The thickness of the resin layer may be adjusted such that (for a certain wavelength) half of the light incident through one "port" (i.e., face of the cube) is reflected and the other half is transmitted due to frustrated total internal reflection. The terminology beam splitter includes polarizing beam splitters, such as the Wollaston prism, which use birefringent materials, splitting light into beams of differing polarization. The terminology "beam splitter further includes a half-silvered mirror (or pellicle) comprising for example to plate of glass with a thin coating of aluminum where approximately half of light incident at a 45 degree angle is transmitted, and the remainder reflected. A dielectric optical coating may be substituted for the metallic coating.

The terminology "phase detector" as used herein comprises a frequency mixer or analog multiplier circuit that generates a voltage signal which represents the difference in phase between two signal inputs. The terminology phase detector includes an electronic phase detector the output of the detector represents the phase difference between the signals.

The terminology "correlation detector" as used herein includes coincidence detection and includes a method of signal detection in which a return or response signal is compared with a reference signal. The terminology "correlation detector" includes cross-correlation detection.

The foregoing description is illustrative of particular embodiments of the invention, but is not meant to be a limitation upon the practice thereof. The following claims, including all equivalents thereof, are intended to define the scope of the invention.

The invention claimed is:

1. A method for generating a series of frames of a video or movie of a subject illuminated by a light source which may be an incoherent, partially coherent, chaotic or entangled light source comprising;
receiving light reflected from the subject into at least one first receiver at first predetermined points in time;
receiving light from the light source into at least one second receiver that detects spatial information relating to the light source illumination independent of interaction with the subject at second points in time, at least some of the second points in time occurring before or after the first points in time;
the at least one first receiver and the at least one second receiver being operatively connected to at least one processor;
transmitting a measured value correlating to the amount of light reflected from the subject from at least one first receiver to at least one processor;
transmitting the spatial information relating to the light source illumination from at least one second receiver to at least one processor;
correlating the measured values from the at least one first receiver at the first points in time with the spatial information derived from the at least one second receiver at the corresponding second points in time;
creating a series of frames for a video of a subject by correlating measured values of light reflected from the subject with spatial information received from the illuminating source at differing instances in time.

2. The method of claim 1 wherein the second points in time occur before or after the first points in time within predetermined time intervals in a range from approximately one femtosecond to approximately one or more seconds after the first points in time.

3. The method of claim 1 wherein the at least one second receiver is remotely located from the at least one first receiver and wherein the at least one second receiver receives light reflected by the subject.

4. The method of claim 1 wherein the step of receiving light from the light source comprises receiving a first plurality of photons emitted from a light source and reflected from the subject into a first receiver at a first location to produce a first receiver signal; and wherein the step of receiving light from the light source into a second receiver comprises receiving a second plurality of photons emitted from the light source to produce a spatially resolved signal using a spatially addressable receiver at a second location, the second plurality of photons reaching the spatially addressable receiver independent of interaction with the subject; and
wherein the correlating of the first receiver signal with spatially resolved signal comprises using the equation:

$$G^{(2)}(\vec{\rho}_1, \vec{\rho}_2, t_1, t_2) = G_{11}^{(1)}(\vec{\rho}_1, \vec{\rho}_1, t_1, t_2) G_{22}^{(1)}(\vec{\rho}_2, \vec{\rho}_2, t_1, t_2) + G_{12}^{(1)}(\vec{\rho}_1, \vec{\rho}_2, t_1, t_2) = G_{21}^{(1)}(\vec{\rho}_2, \vec{\rho}_1, t_1, t_2)$$

where $G_{11}^{(1)} G_{22}^{(1)}$ is approximately equal to $G_0$ and $G_0$ is a constant, and $G_{12}^{(1)} G_{21}^{(1)}$ is approximately equal to $\delta(\vec{\rho}_1 - \vec{\rho}_2)$ when $t_1$ and $t_2$ are within the coherence time of the system and $\delta(\vec{\rho}_1 - \vec{\rho}_2)$ represents the $\delta$-function non-local position-position correlation; and $\rho_1$ and $\rho_2$ are the transverse spatial coordinates of the first and second detectors respectively and $t_1$, $t_2$ are the temporal coordinates of the first and second receivers.

5. The method of claim 1 wherein the light received by the at least one first receiver comprises stimulated fluorescence light and the light received by the at least one second receiver comprises light stimulating the stimulated fluorescence light.

6. The method of claim 1 wherein the at least one first receiver comprises a plurality of spatially integrated detectors which receive angularly distinct reflections from the vicinity of but absent reflections from the subject illuminated by the light source.

7. The method of claim 1 wherein the measured values from the at least one first receiver and the spatial information from the at least one second receiver are partitioned into a set of sequential groups at a fixed advanced or delayed time intervals, each sequential group then being processed in order to generate an image of the subject that is stored as a single frame of a video or movie of the subject.

8. The method of claim 1 wherein the measured values from the at least one first receiver and the spatial information from the at least one second receiver are processed in a sequence of time delays, each time delay then being processed to generate an image of the subject that is stored as a single frame of a video or movie of the subject; and wherein certain of the frames in a sequence of time delays being operative to produce an image of a subject in a different apparent position.

9. The method of claim 8 wherein a line of pixels is extracted from each frame of the video or movie and stored in an array; each line of extracted line of pixels is stored in the array indexed by the frame number that the extracted line of pixels was extracted from; and wherein a composite image is generated that exhibits interference fringe patterns; the interference fringe patterns being further processed to reveal more detailed height information about the target object.

10. The method of claim 1 wherein the obscuring medium is fog, an aerosol, particulates, turbulence, liquid, or frosted glass and the distortion caused by the obscuring medium is corrected through corrective optics.

11. The method of claim 1 wherein the light reflected from the subject comprises a first plurality of photons and the light that illuminates the second receiver comprises a second plurality of photons and further comprising directing at least one of the first plurality of photons or the second plurality of photons through a monochromator prior to the displaying the correlated image.

12. The method of claim 1 wherein the at least one first receiver comprises a spatially integrated detector and the at least one second receiver comprises a spatially addressable detector and wherein both of the spatially integrated detector and the spatially addressable detector are charged coupled devices, and wherein the spatially integrated detector further comprises means for modifying sensitivity of specific pixels on the spatially integrated detector prior to producing the at least one first receiver measured signal.

13. A system for creating images of a subject illuminated by a incoherent, partially coherent, chaotic or entangled light source comprising:
at least one processor for processing information;
at least one first receiver for receiving light influenced by the subject operatively connected to the processor; the at least one first receiver transmitting to the at least one processor measured values devoid of spatial information at first predetermined time intervals;
at least one second receiver adapted to receive light from an incoherent, partially coherent, chaotic or entangled light source, the at least one second receiver being operatively connected to the processor; the at least one second receiver operating to receive and transmit spatial information regarding the light source at second time intervals, at least some of the second time intervals occurring before or after the first time intervals; the spatial information regarding the light source being devoid of information concerning the subject;
the at least one processor operating to correlate the measured values from the at least one first receiver at the predetermined intervals of time with the spatial information derived from the at least one second receiver to create images of the subject.

14. The system of claim 13 wherein the images of the subject are a series of frames which form a motion picture or video.

15. The system of claim 14 wherein a line of pixels is extracted from each frame of the motion picture or video and stored in an array indexed by the frame number, to be further processed to extract detailed surface height information of the subject.

16. The system of claim 13 wherein the at least one first receiver comprises a plurality of first receivers operative to detect the influence of a subject on the beam; the plurality of first receivers being operatively connected to the processor and operating to transmit nonspatial information to the processor; the plurality of first receivers being spaced at known, different distances from the subject, whereby comparison of each of the outputs of the plurality of first receivers provides three dimensional information concerning the subject; the processor operating to correlate the outputs of the plurality of first receivers.

17. The system of claim 13 wherein the at least one second receiver comprises an array of pixel locations for detecting high resolution spatial information concerning the illumination and operating to transmit high resolution spatial information correlated to specific intervals of time to the processor; the at one first receiver operating to transmit low resolution spatial information to the processor correlated to specific intervals of time; the processor operating to correlate a response by the at least one receiver with spatial information derived from the spatial receiver at a correlating intervals of time to create a high resolution image of the subject.

18. A system for creating images of a subject illuminated by a incoherent, partially coherent, chaotic or entangled light source comprising:
at least one processor for processing information;
at least one first receiver for receiving light reflected from the vicinity of but absent reflections directly from the subject without spatial information; the at least one first receiver transmitting to the at least one processor measured values devoid of spatial information at first predetermined time intervals;
at least one second receiver adapted to receive light from an incoherent, partially coherent, chaotic or entangled light source, the at least one second receiver being operatively connected to the processor; the at least one second receiver operating to receive and transmit spatial information regarding the light source at second time intervals, at least some of the second time intervals being advanced before or delayed after the first time intervals; the spatial information regarding the light source being devoid of information concerning the subject;
the at least one processor operating to correlate the measured values from the at least one first receiver with the spatial information derived from the at least one second receiver to create images of the subject.

19. The system of claim 18 wherein the at least one first receiver collects only the amount of light reflected from the vicinity of but absent reflections from subject and does not record information concerning the internal features, outline or dimensions of the vicinity of the subject.

20. The system of claim 18 wherein the at least one second receiver collects spatial information from the light source which is transmitted to the at least one processor and wherein the at least one processor creates the internal features, outline or dimensions of the subject based only on the spatial information of the light source and the amount of light measured by the at least one first receiver during a corresponding advanced or delayed time interval.

* * * * *